US011027673B1

(12) United States Patent
Abdelrahman et al.

(10) Patent No.: US 11,027,673 B1
(45) Date of Patent: Jun. 8, 2021

(54) VEHICLE PARTITION DEVICES, ASSEMBLIES, SYSTEMS, AND METHODS OF USING THE SAME

(71) Applicant: PHANTOM INC., Claymont, DE (US)

(72) Inventors: Mohamed E. Abdelrahman, Pittsburgh, PA (US); Salahaldeen Ali, Fontana, CA (US)

(73) Assignee: PHANTOM INC., Claymont, DE (US)

( * ) Notice: Subject to any disclaimer, the term of this patent is extended or adjusted under 35 U.S.C. 154(b) by 0 days.

(21) Appl. No.: 17/065,810

(22) Filed: Oct. 8, 2020

(51) Int. Cl.
*B60N 2/90* (2018.01)
*B60R 13/08* (2006.01)

(52) U.S. Cl.
CPC ............ *B60R 13/0823* (2013.01); *B60N 2/91* (2018.02); *B60R 2013/0807* (2013.01)

(58) Field of Classification Search
CPC .............. B60R 13/0823; B60R 21/06; B60R 2013/0807; B60N 2/91
USPC ................................. 296/24.4, 24.43, 24.46
See application file for complete search history.

(56) References Cited

U.S. PATENT DOCUMENTS

| | | | |
|---|---|---|---|
| 2,311,355 A * | 2/1943 | Thornquist | E04H 15/60 135/114 |
| 2,997,331 A * | 8/1961 | Kudner | B60R 21/026 296/24.46 |
| 2,998,279 A | 8/1961 | Mateny | |
| 4,938,401 A | 7/1990 | Weisbrodt et al. | |
| 4,938,518 A | 7/1990 | Willemsen | |
| 5,058,941 A | 10/1991 | Solomon et al. | |
| 5,382,068 A * | 1/1995 | Simmons | B60R 7/08 160/327 |
| 5,971,487 A | 10/1999 | Passehl | |
| 6,120,076 A | 9/2000 | Adsit et al. | |
| 7,322,626 B2 | 1/2008 | Thomas | |
| 8,714,655 B2 | 5/2014 | Cahall et al. | |
| 9,499,271 B2 | 11/2016 | Walton et al. | |
| 2005/0194827 A1 | 9/2005 | Dowty et al. | |

(Continued)

FOREIGN PATENT DOCUMENTS

| | | | | |
|---|---|---|---|---|
| CA | 2390588 A1 * | 5/2001 | ............ | B60R 7/005 |
| DE | 2054799 A1 * | 5/1972 | ............ | B60R 21/06 |

(Continued)

OTHER PUBLICATIONS

Sneeze Guardian [online], [retrieved Dec. 15, 2020]. Retrieved from the Internet <URL: https://sneezeguardian.com/.

(Continued)

*Primary Examiner* — Hilary L Gutman
(74) *Attorney, Agent, or Firm* — Bryan Cave Leighton Paisner LLP

(57) ABSTRACT

This disclosure is related to vehicle partition devices, assemblies, systems, and methods of using the same. The vehicle partition devices can be configured to prevent, or at least mitigate, the spread of pathogens inside of a vehicle cabin. In certain embodiments, the vehicle partition devices can include a flexible and/or deformable configuration that permits the vehicle partitions to be easily installed and uninstalled within vehicle cabins of varying sizes. In certain embodiments, the vehicle partition devices also can be transitioned to spacing-saving configurations, which permit the vehicle partition devices to be stored compactly when not in use.

20 Claims, 18 Drawing Sheets

(56) References Cited

U.S. PATENT DOCUMENTS

| | | | |
|---|---|---|---|
| 2006/0103155 A1* | 5/2006 | Spater | B60R 21/06 296/24.46 |
| 2008/0136205 A1* | 6/2008 | Hoffman | B60R 21/06 296/24.46 |
| 2012/0068490 A1* | 3/2012 | Vance | B60N 2/91 296/24.46 |
| 2012/0111510 A1* | 5/2012 | Chak | B60R 7/04 160/368.1 |
| 2016/0250986 A1 | 9/2016 | Kalis | |
| 2017/0106805 A1 | 4/2017 | Davis | |

FOREIGN PATENT DOCUMENTS

| | | | | |
|---|---|---|---|---|
| DE | 19531304 A1 * | 2/1997 | | B60P 7/0876 |
| DE | 29716232 U1 * | 10/1997 | | B60R 21/06 |
| DE | 10022078 A1 * | 11/2001 | | B60R 21/232 |
| DE | 102014008102 B3 * | 9/2015 | | B60R 7/005 |
| DE | 202020102305 U1 * | 5/2020 | | B60R 21/12 |
| DE | 202020102690 U1 * | 7/2020 | | B60R 21/06 |
| EP | 0027483 A1 | 4/1981 | | |
| EP | 0957006 A2 | 11/1999 | | |
| EP | 0995641 A1 * | 4/2000 | | B60R 21/06 |
| EP | 1657121 A1 | 5/2006 | | |
| EP | 2703533 A1 * | 3/2014 | | D04B 21/10 |
| JP | 3181346 U * | 1/2013 | | B60H 1/00592 |

OTHER PUBLICATIONS

Rideshare Shields [online], [retrieved Dec. 15, 2020]. Retrieved from the Internet <URL: https://www.amazon.com/Rideshare-Protective-Lightweight-Shatterproof-Polycarbonate/dp/B087ZQJY7R>.

Compass Health Shield [online], [retrieved Dec. 15, 2020]. Retrieved from the Internet <URL: https://www.compasshealthshield.com/auto-health-shield>.

Axiom Print [online], [retrieved Dec. 15, 2020]. Retrieved from the Internet <URL: https://axiomprint.com/product/ride-guard-542>.

Quality Logo Products [online], [retrieved Dec. 14, 2020]. Retrieved from the Internet <URL: https://www.qualitylogoproducts.com/protection-and-shields/vehicle-sneeze-guard.htm>.

D&S Automotive [online], [retrieved Dec. 15, 2020]. Retrieved from the Internet <URL: https://www.ds-automotive.com/coronavirus-update/>.

* cited by examiner

VEHICLE PARTITION DEVICES, ASSEMBLIES, SYSTEMS, AND METHODS OF USING THE SAME

TECHNICAL FIELD

This disclosure is related to vehicle partition devices, assemblies, systems, and methods of using the same. The vehicle partition devices, assemblies, and systems can be utilized to segment or divide a vehicle cabin in separate portions, and to prevent the spread of pathogens within the cabin. The configurations of vehicle partition devices, assemblies, and systems permit them to be quickly and easily installed in nearly any type of vehicle.

BACKGROUND

Vehicle partitions can be installed inside of a vehicle (e.g., an automobile or car) to divide or segment an interior cabin inside of the vehicle. However, traditional vehicle partitions suffer from various drawbacks. One problem associated with traditional vehicle partitions is that they often require hardware (e.g., nuts, bolts, screws, bolts, etc.) and/or hook and loop connectors (e.g., VELCRO® connectors) to be installed within the cabin of the vehicle. For example, hardware may be used to secure the vehicle partitions to portions of the ceiling, floor, and/or side walls of a vehicle cabin. Installing a vehicle partition in this manner can result in significant damage to the interior cabin and/or other portions of the vehicle (e.g., damage resulting from the creation of holes for hardware components and/or damage to the interior lining within the cabin).

Another drawback associated with the traditional vehicle partitions is that they cannot be quickly and easily installed/uninstalled when desired by a vehicle operator or owner. Because installation can involve the use of hardware to secure the vehicle partitions inside a vehicle cabin, significant time and effort can be expended during installation. Moreover, many traditional vehicle partitions are intended to be permanently installed within a vehicle, and therefore are not designed to be removable. Thus, removing the vehicle partitions also can require significant time and effort (e.g., associated with disconnecting various screws, bolts, nuts, etc.).

A further drawback associated with the traditional vehicle partitions is that they are typically designed for use with specific types of vehicles (e.g., sedans, sports utility vehicles (SUVs), etc.) and/or specific models of vehicles. For example, a traditional vehicle partition designed for use in a sedan typically may not be used in a SUV due to the difference in cabin sizes. Similarly, a traditional vehicle partition designed for use in a specific vehicle model typically may not be used in other vehicle models (even if the vehicles are the same vehicle type). Thus, partitions are often customized based on the vehicle model or type. The lack of versatility across different vehicle types and/or models can often be attributed to the rigid structures or configurations of traditional vehicle partitions, which are unable to accommodate varying dimensions of cabin sizes across different vehicle types and/or models.

Furthermore, ride-hailing services (e.g., such as those offered by UBER®, LYFT®, and other companies) are ubiquitous in many areas of the world. Vehicle operators for these services often operate their vehicles for both personal use and business use. While it may be desirable to have a vehicle separator installed when the vehicle is used for commercial or large-group activities, it may not be desirable to have the vehicle separator installed when the vehicle is being operated for personal use. Unfortunately, as mentioned above, traditional vehicle partitions are difficult to install/uninstall, and often result in damage to the vehicle cabins. Therefore, the vehicle operators cannot conveniently and easily remove or reattach the traditional vehicle partitions when the vehicles are being transitioned from personal use to business use, or vice versa.

Additionally, in recent times, COVID-19 (also known as coronavirus disease 2019) is a virus that has rapidly spread and is of particular concern to both vehicle operators and passengers alike. There have been major efforts across the world to prevent the spread of this virus. These efforts have resulted in a dramatic decrease in taxi, shuttle and ride-hailing/sharing service usage due, at least in part, to fears of spreading the virus and government regulations requiring vehicle operators to take preventative measures to limit the spread of the virus. In certain jurisdictions, vehicle operators of ride-hailing services may be required to have a vehicle separator installed in their vehicle while the vehicle is being used for business purposes. Because traditional vehicle separators cannot be easily installed and uninstalled as desired, many vehicle operators have been forced to choose between damaging or significantly altering the interior cabins of their vehicles by installing traditional vehicle separators, or not operating their vehicles in compliance with governmental regulations.

Accordingly, there is a need for improved vehicle partition devices, assemblies, systems, and methods of using the same which allow the vehicle separators to be quickly and easily installed in vehicles of various makes, models and cabin sizes. There is also a need for improved vehicle partition devices, assemblies, systems, and methods of using the same which allow the vehicle separators to be efficiently installed/uninstalled without damaging interior cabins of vehicles.

BRIEF DESCRIPTION OF DRAWINGS

To facilitate further description of the embodiments of this disclosure, the following drawings are provided, in which like references are intended to refer to like or corresponding parts, and in which.

DETAILED DESCRIPTION OF EXEMPLARY EMBODIMENTS

Figure 1:
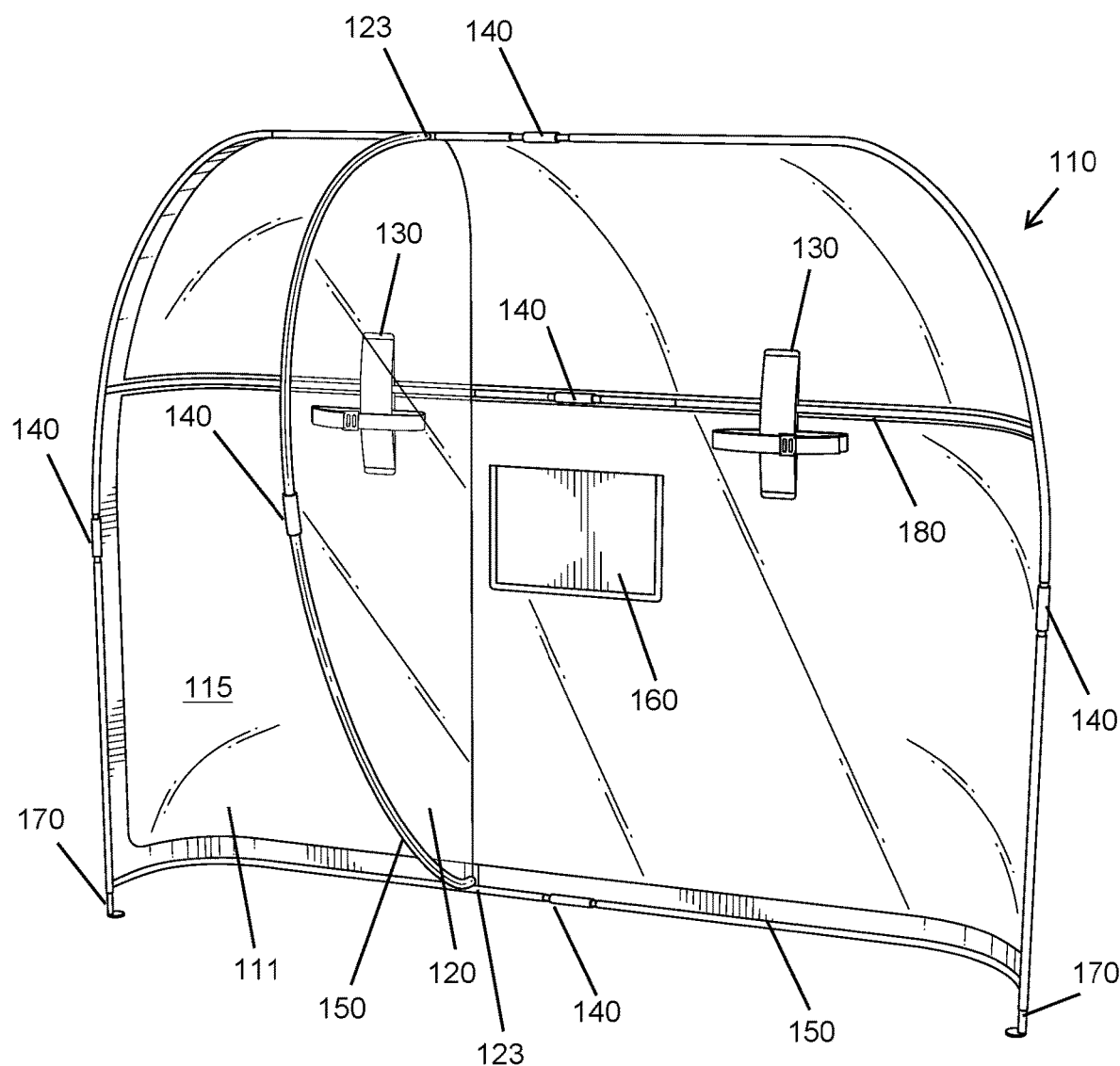
FIG. 1 is a rear perspective view of a vehicle partition in accordance with certain embodiments.
Figure 2:
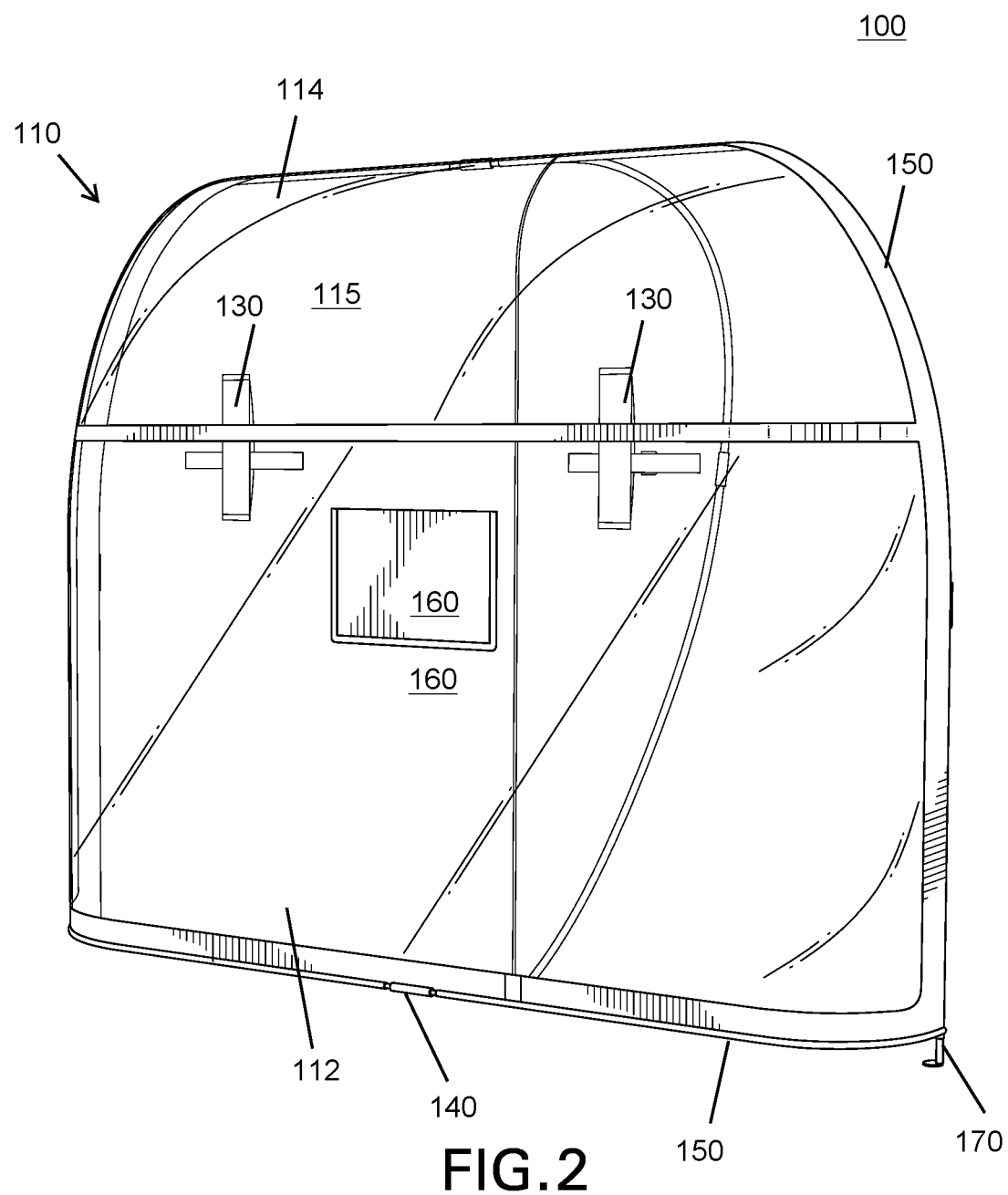
FIG. 2 is a front perspective view of the vehicle partition in accordance with certain embodiments.

The present disclosure relates to improved vehicle partition devices, assemblies, systems, and methods and of using the same. In certain embodiments, vehicle partitions are disclosed which can be quickly and easily installed and uninstalled inside of a vehicle cabin without damaging the vehicle cabin. The vehicle partitions can protect individuals within the vehicle, e.g., such as by preventing or limiting the spread pathogens (e.g., viruses, bacteria, and/or other substances that can cause infections and/or diseases) amongst the individuals within the vehicle. In certain embodiments, the vehicle partitions also can serve as a physical barrier that protects the driver or other individuals in the vehicle from attacks, assaults, and/or the like.

In certain embodiments, the vehicle partitions described herein can include a first partition portion that separates a front portion of a vehicle cabin from a rear portion of the vehicle cabin (e.g., a separator or barrier that divides the driver seat and front passenger seat in the vehicle cabin from the portion of the cabin including the rear passenger seats). The vehicle partition also can include a second partition portion that segments the front portion of a vehicle cabin (e.g., a separator or barrier that separates the driver seat from front passenger seat). The first and second partition portions can isolate the driver or operator of the vehicle from passengers situated in the front passenger seat and/or rear passenger seats.

The vehicle partitions can be configured so as to be installable universally in nearly any vehicle type and/or vehicle model regardless of the vehicle cabin size. The size of a vehicle cabin across different vehicle types and/or models may vary. For example, the vehicle cabin of sedan is typically smaller than the vehicle cabin of a sports utility vehicle (SUV), and the vehicle cabin of a SUV is typically smaller than that of truck or van. Likewise, the vehicle cabin of a particular vehicle model may differ in size from the vehicle cabins of other vehicle models. As described in further detail below, the vehicle partitions disclosed herein can include configurations that enable the vehicle partitions to accommodate varying cabin sizes, and to be quickly and easily installed in nearly any vehicle (or at least a large percentage of vehicles that are currently available and/or compliant with SAE® Recommended Practices for Motor Vehicle Dimensions).

The vehicle partitions also can be outfitted with features that enable the vehicle partitions to be transitioned to space-saving configurations for compact storage of the vehicle partitions. For example, the various portions of the vehicle partitions (e.g., such as the first and second partition portions) can be outfitted with joint members (e.g., hinges, and/or similar components) that enable the vehicle partitions to be folded into space-saving configurations. Additionally, certain portions of the vehicle partitions (e.g., such as the second partition portion) can be removed or detached from the vehicle partitions and/or can include telescoping features (e.g., such as the support structures), both of which can minimize the size and/or dimensions of the vehicle partitions.

As evidenced by the disclosure herein, the vehicle partitions described herein provide various advantages and benefits that overcome some or all of the aforementioned drawbacks associated with traditional vehicle partitions. One significant advantage relates to the fact that the vehicle partitions can prevent, or at least mitigate, the spread of pathogens inside of a vehicle. For example, the first partition portion can provide a barrier that prevents or limits airborne pathogens from freely flowing between the front and rear portions of a vehicle cabin, and the second partition portion can prevent or limit pathogens from flowing between the driver and front passenger seats. Another advantage is that the vehicle partitions can include a flexible and/or deformable configuration that permits the vehicle partitions to be easily installed by situating and/or press-fitting the vehicle partitions into a desired position within the vehicles. As explained in further detail below, the dimensions, shapes, materials, and structural features of the vehicle partitions facilitate the quick and easy installation/uninstallation of the vehicle partitions.

Another advantage is that the vehicle partitions can be installed in nearly any type of passenger vehicle (e.g., sedan, SUV, truck, van, etc.) and/or any passenger vehicle model regardless of cabin size. Another advantage is that the vehicle partitions can be installed in vehicle cabin without using hardware (e.g., screws, nuts, bolts, etc.) to attach the vehicle partitions to walls or structures within the vehicle cabin. Notably, this permits the vehicle partitions to be installed and/or uninstalled without damaging interior portions of the vehicle cabins. Another advantage is that the vehicle partitions can easily be transitioned to spacing-saving configurations, which permit the vehicle partitions to be easily stored when not in use. Additional advantages of the vehicle partitions will be apparent based on the disclosure herein.

It should be noted that any feature described for an embodiment illustrated in the figures or otherwise described herein can be incorporated into, or combined with, any other embodiment described herein. Moreover, one of ordinary skill in the art would recognize that the shapes, configurations, and/or structures of the vehicle partitions can vary, and that the components of the vehicle partition assemblies can be configured in other arrangements. It should also be recognized that none of the features described herein are to be considered essential and can be omitted in various embodiments.

FIGS. 1-8 disclose an exemplary embodiment of a vehicle partition 100 according to certain embodiments. FIGS. 11-18 disclose another exemplary embodiment of a vehicle partition 100 according to certain embodiments.

The vehicle partitions 100 comprise a first partition portion 110 and a second partition portion 120. Periphery members 150 surround and/or define the perimeters or boundaries of the first partition portion 110 and the second partition 120. A lateral support member 180 extends horizontally across the body 115 of the first partition portion 110. In certain embodiments (such as the one illustrated in FIGS. 1-8), the periphery members 150 and lateral support member 180 are connected by joint members 140, each of which includes a hinge that enables the first partition portion 110 and the second partition 120 to be transitioned to space-saving configurations as described in further detail below. In other embodiments (such as the one illustrated in FIGS. 11-18), the joint members 140 of the periphery members 150 and lateral support member 180 do not comprise hinge members and both partition portions can be folded at locations where there are gaps between the rods included within the sleeves of the periphery members 150.

The first partition portion 110 further includes one or more support structures 170 that are configured to rest on a floor or bottom surface of a vehicle cabin, and support the vehicle partition 100 while in use. The first partition portion 110 further comprises one or more attachment members 130 that assist with securing the vehicle partition 100 to headrests, passenger seats, and/or other structures located in a vehicle cabin. The first partition portion 110 also includes a window 160 that can be sealed and unsealed as desired. Exemplary configurations and details pertaining to aforementioned features of the vehicle partitions 100 is described in further detail below.

The vehicle partition 100 can be installed anywhere inside a vehicle cabin. In certain embodiments, the vehicle partition 100 can be installed directly behind a driver seat and/or front passenger seat in a vehicle cabin. If a vehicle has more than two rows of seats, the vehicle partition 100 (or multiple vehicle partitions 100) can also be installed behind any row of seats.

The first partition portion 110 comprises a first surface 111 and a second surface 112. When the vehicle is installed in a vehicle cabin, the first surface 111 can be situated such that it faces the windshield or front portion of the vehicle, and the second surface 112 can be situated such that it faces the rear passenger seats or rear portion of the vehicle.

The configuration of the first partition portion 110 (including its size, shape, and materials) can vary. In certain embodiments, the body portion 115 of the first partition portion 110 comprising the first surface 111 and the second surface 112 can be constructed of a translucent and/or transparent material. These materials allow for two-way visibility between front and rear portions of the vehicle. In certain embodiments, the body portion 115 may be constructed of MYLAR® (e.g., biaxially-oriented polyethylene terephthalate), vinyl, polymers, plastics, and/or other similar materials. The body portion 115 can be constructed of other materials as well.

In certain embodiments, the body portion 115 can be constructed of a deformable material, such as a shape-memory polymer (e.g., one that includes vinyl or MYLAR®) and/or other shape-memory materials, that permits the body portion 115 to temporarily deform (e.g., when it is installed in a vehicle cabin and/or in use inside a vehicle) and to return to its original shape (e.g., when it is uninstalled and/or not in use). For example, as explained in further detail below, the dimensions of the first partition portion 110 may be slightly larger than the size of a vehicle cabin to permit the first partition portion 110 to be installed by simply pushing, pulling, or placing the first partition portion 110 into place in a desired location within the vehicle cabin. Because the size of the first partition portion 110 is slightly larger (e.g., in width and height) than the size of the vehicle cabin, the walls of the vehicle cabin will apply pressure on the first partition portion 110 when it is installed, thus securing the first partition portion 110 in the desired location. When this happens, the flexibility and/or deformability of the shape-memory polymer (or other deformable material used for the body portion) allows the first partition portion 110 to accommodate this pressure (e.g., by causing it to bulge outwards slightly) without breaking or damaging the first partition portion 110.

Figure 9A:
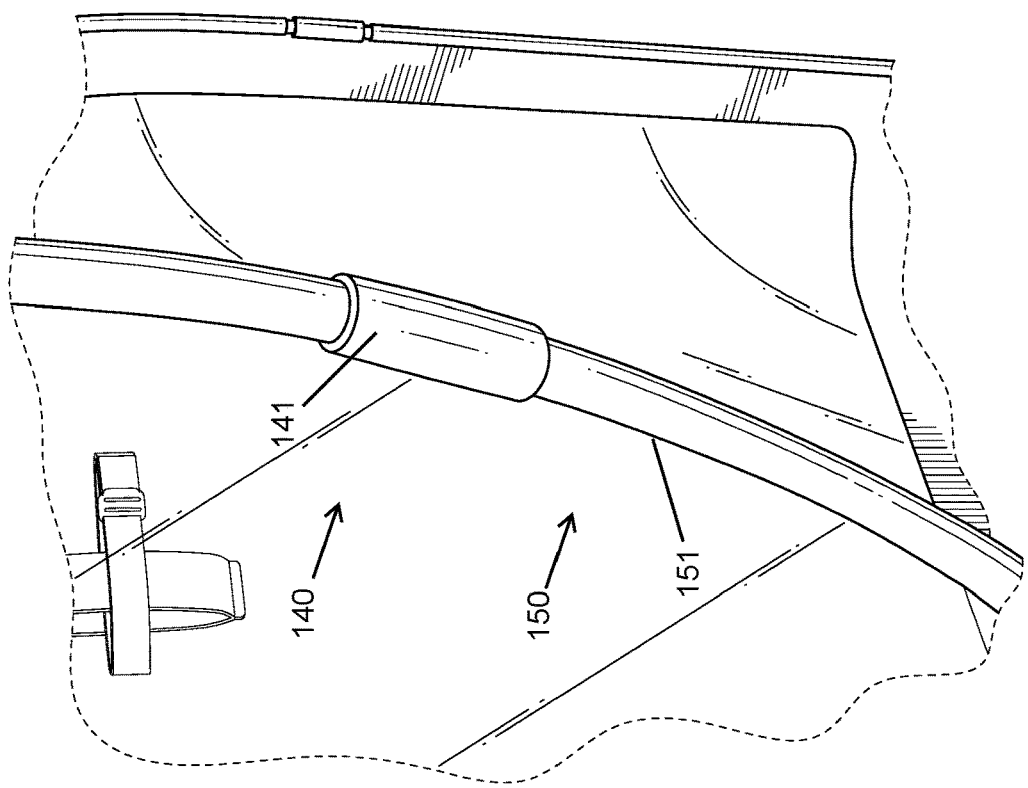
FIG. 9A is an exemplary joint member in an uncovered position in accordance with certain embodiments.
Figure 19A:
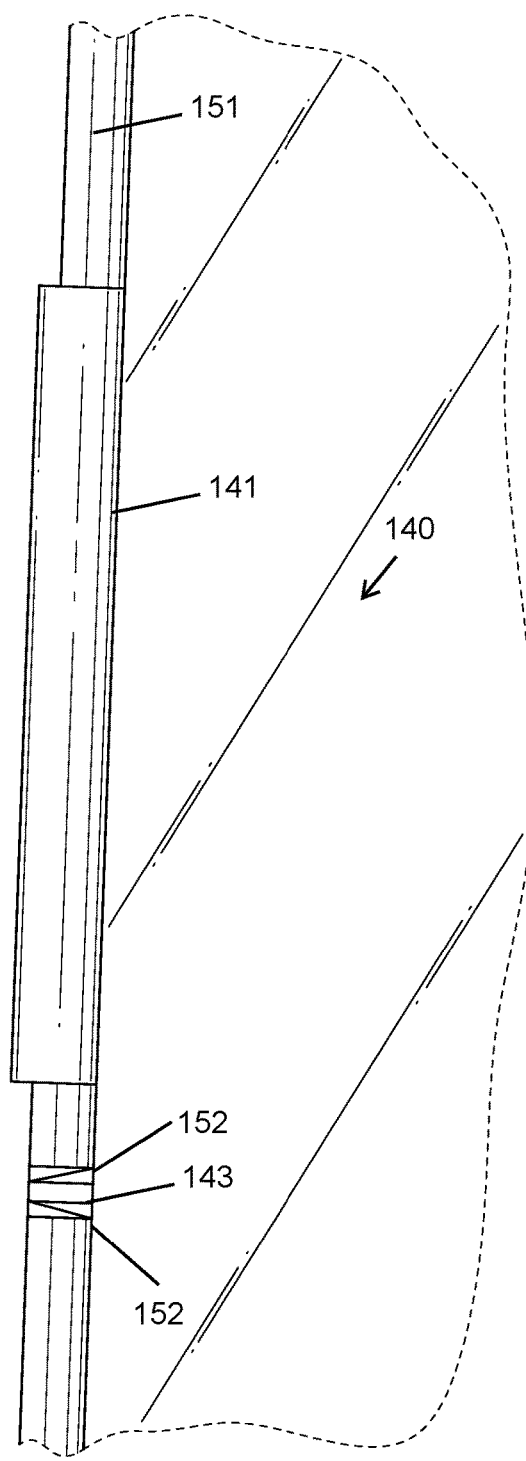
FIG. 19A is an exemplary joint member in an uncovered position in accordance with certain embodiments.

The periphery members 150 surrounding the body portion 115 of the first partition portion 110 may include sleeves 151 (see FIGS. 9A and 19A) that house and/or receive rod members 152 (see FIGS. 9A and 19A). The sleeves 151 and rod members 152 may be constructed of any appropriate materials. For example, sleeves 151 may be constructed of nylon, cloth/fabric, thermoplastics, synthetic polymers, metals, and/or other materials. In some embodiments, the sleeves 151 may be fabricated of a soft material (e.g., nylon, cloth, etc.) and, in other embodiments, the sleeves 151 may be fabricated of a solid material (e.g., rigid plastics, metals. etc.). Each sleeve 151 may include a channel or duct that receives one of the rod members 152. The rod members 152 may be constructed of fiberglass, polymers, metals, wood, and/or other materials.

In certain embodiments (e.g., such as the embodiment in FIGS. 1-8), the rod members 152 can be connected by hinges 142 located at the joint members 140 at various points around the perimeter of the first partition portion 110. Like the periphery members 150, the lateral support member 180 also can include sleeves 151 and hinges 142 that connect flexible rods members 152. In other embodiments (e.g., such as the embodiment in FIGS. 11-18), the rod members 152 included in the periphery members 150 are not directly connected to each other using a hinge or other structure, and a gap or break may exist between adjacent rod members 152. Moreover, in some embodiments (e.g., such as in FIGS. 11-18), the configuration of the lateral support member 180 may be varied, e.g., such that it does not include the rod members 152 that are included in periphery members 150 and, instead, includes one or more deformable band members 153, such as one or more deformable metal band members (e.g., deformable aluminum band member) or one or more deformable plastic band members, included inside of the sleeves 151 of the lateral support member 180.

The periphery members 150 and lateral support member 180 (including the rods 152, deformable band members 153, and sleeves 151 associated with these components) define the general shape of the first partition portion 110. The lateral support member 180 assists with maintaining the tautness and curvature of the main body portion 115. Additionally, the rods 152 and deformable band members 153 also can be constructed of materials that facilitate the easy installation of the product within vehicle cabins of varying sizes. For example, in certain embodiments, the rod members 152 can be constructed of a flexible and/or deformable material (e.g., such as fiberglass). Likewise, the deformable band members 153 may be constructed of a thin piece or sheet of metal (e.g., aluminum) or plastic that is flexible. The flexibility of the rods 152 and deformable band members 153 can complement or supplement the flexibility of the body portion 115 during installation of the first partition portion 110. For example, when the first partition portion 110 is sized larger than the vehicle cabin, the flexibility of the rods 152 and deformable band members 153 permit the shape of the first partition portion 110 to be slightly compacted when the first partition portion 110 is pushed into place in a desired location within the vehicle cabin. The combination of the flexible body portion 115, flexible rods 152, and/or deformable band members 153 allows the first partition portion 110 to deform and accommodate vehicle cabins of various sizes.

The size and/or dimensions of the first partition portion 110 can be any appropriate size that is capable of fitting inside a car cabin. In certain embodiments, the width of the first partition portion 110 is approximately 52-62 inches (and, is some cases, approximately 57 inches), the height is approximately 42-52 inches (and, is some cases, approximately 47 inches), and the depth (of the material used for the body portion 115) is approximately 0.002-0.04 inches (and, is some cases, approximately 0.01 inches). The depth of the entire body portion 115 (measured from the second surface 112 to the periphery member 150 located on the top of the body portion 115) may be approximately 3-15 inches (and, is some cases, approximately 5-8 inches).

In certain embodiments, the size and/or dimensions of the first partition portion 110 can be selected to facilitate a snug or tight fitting of the first partition portion 110 within the vehicle cabin. A typical vehicle cabin for a sedan vehicle is approximately 56 inches in width and 49 inches in height in the area of the vehicle cabin located directly behind the driver seat, and a typical vehicle cabin for a SUV vehicle is approximately 57 inches in width and 53 inches in height in the area of the vehicle cabin located directly behind the driver seat. To facilitate a tight fitting of the first partition portion 110 inside a vehicle cabin (without using any hardware), the width and height of the first partition portion 110 may be sized such that it is slightly larger (e.g., approximately 57 inches in width and 47 inches in height) than the width and/or height of the vehicle cabin. This permits a user to simply and easily install the first partition portion 110 by pushing or pressing it into the desired location (e.g., directly behind the driver seat and front passenger seat), and the walls of the interior vehicle cabin will cause pressure to be applied around the perimeter of the first partition portion 110, thus holding and securing the first partition portion 110 in the desired location.

In certain embodiments, the support structures 170 located at the bottom of the first partition portion 110 can include adjustment mechanisms that further assist with installing and securing the first partition portion 110 in a manner that accommodates varying cabin sizes. Because the height of a vehicle cabin may vary (e.g., the height of a SUV cabin is larger than a sedan cabin), the adjustment mechanisms may permit the height of the first partition portion 110 to be adjusted (e.g., raised or lowered). This can help to ensure that the first partition portion 110 is tightly fit and secured inside the vehicle cabin.

The configuration of the support structures 170 can vary. In certain embodiments, the support structures 170 may be constructed of plastics, polymers, fiberglass, metals (e.g., steel, iron, nickel, etc.), and/or other materials. In certain embodiments, the adjustment mechanisms can include telescoping shaft portions that permit the support structures 170 to be vertically extended and/or retracted. For example, in some cases, the support structures 170 may be approximately 1-5 inches (and, in some cases, approximately 3 inches) when retracted, and approximately 5-10 inches (and, in some cases, approximately 6 inches) when extended. Other types of adjustment mechanisms may also be incorporated into the support structures 170 that permit the height of the support structures 170 and/or first partition portion 110 to be extended and/or retracted.

A channel 190 (see FIG. 3) is formed between the support structures 170 and beneath the lower periphery member 150. The channel 190 extends the width of the first partition portion 110, and permits limited air flow (e.g., air conditioning and/or heat) between the front and rear portions of a vehicle when the vehicle partition 100 is installed. The channel 190 is strategically located near the bottom of the vehicle partition 100 such that it permits air flow without impeding the ability of the vehicle partition 100 to limit the spread of pathogens, which typically originate from an individual's mouth or nose (e.g., a result of coughing or sneezing). The channel 190 also provides the additional benefit of permitting passengers to position their feet comfortably beneath the vehicle partition 100. In certain embodiments (e.g., such as in FIGS. 11-18), the lower periphery member 150 may not include flexible rods 152 (or other any components such as hinges), which can be beneficial because the flexible rods 152 will not contact passengers' feet. Additionally, the lower section of the first partition portion 110 may include one or more connectors (e.g., hook-and-loop connectors or VELCRO® connectors) that enable the lower section to be connected to passenger seats (e.g., the driver seat and/or front passenger seat). In certain embodiments, a detachable covering may be included with the vehicle partition that blocks and/or conceals the channel 190 to prevent or limit air flow through the channel 190.

The shape of the first partition portion 110 can vary and can generally include any shape (e.g., circular, rectangular, square, etc.). In certain embodiments, the first partition portion 110 can be generally shaped in a manner that is same as, or similar to, the shape of a typical vehicle cabin. For example, the periphery members 150 on the sides of the first partition portion 110 can be substantially straight and vertical, while the periphery members 150 on the top portion of the first partition portion 110 is substantially straight and horizontal. The center of the body portion 115 is substantially flat or planar and can be situated perpendicular with respect to the underlying surface of the vehicle cabin. Around the top and side portions of the first partition portion 110, the body portion 115 can begin to curve, ultimately forming a pair of side walls 113 (see FIGS. 5 and 6) and a top wall 114 (see FIG. 2). The body portion 115 of the first partition portion 110 gradually begins to curve above the lateral support member 180 to form the top wall 114. The combination of constructing the first partition portion 110 in a general vehicle cabin shape with the gradual curvature along the side and top portions of the first partition portion 110 is beneficial because it permits the first partition portion 110 to accommodate vehicle cabins of vary sizes. It is also beneficial because the curvature permits the vehicle partition 100 to receive and accommodate the driver seat and front passenger seat beneath the top periphery member 150, thus providing more space in the rear portion of the vehicle.

As described above, the materials (e.g., the deformable and/or flexible materials used for the body portion, rods, and/or deformable bands), dimensions (e.g., approximately 57 inches in height and 47 inches in width), shapes (e.g., the general vehicle cabin shape with gradual curvature along the side and top portions), and other structural features (e.g., the adjustment members of the support structures) of the first partition portion 110 can each contribute to quick and easy installation and uninstallation of the vehicle partition 100, and can allow the first partition portion 110 to be installed in vehicles having varying cabin sizes. The combination of these features can facilitate a press fit connection (e.g., an interference fit and/or friction fit connection) between the first partition portion 110 and the vehicle cabin, thus permitting the vehicle divider 100 to be installed without hardware and in nearly any vehicle (e.g., including both sedans and SUVs).

To install the vehicle divider 100, an individual can simply to situate the first partition portion 110 inside of a vehicle cabin (e.g., behind the front row of seats) such that the first surface 111 is facing the front of the vehicle, and then apply pressure to the first partition portion 110 towards the direction of the windshield or front portion of the vehicle. The flexible materials and curvature of the first partition portion 110 near the side walls 113 and top wall 114 permit the first partition portion 110 to accommodate varying cabin sizes. To uninstall or remove the first partition portion 110, a user can simply apply pressure to the first partition portion 110 in the opposite direction to undo the press fit connection.

As mentioned above, the shape, size, and/or configuration of the first partition portion 110 can vary. For example, in other embodiments, the first partition portion 110 may be generally flat or planar with little or no curvature. Likewise, in some embodiments, the first partition portion 110 may be fabricated without the lateral support member 180 and/or one or more of the periphery members 150. Other modifications can also be incorporated in the first partition portion 110.

In some embodiments, the first partition portion 110 can include one or more attachment members 130 to further assist with securing the first partition portion 110 in place during usage. The configuration and types of attachment members 130 can vary. In certain embodiments, the attachment members 130 may include one or more connectors for connecting the first partition portion 110 to headrests (or other portions) of the driver and passenger seats located in the front portion of a vehicle. The types and configurations of the connectors incorporated into the attachment members 130 can vary.

Figure 3:
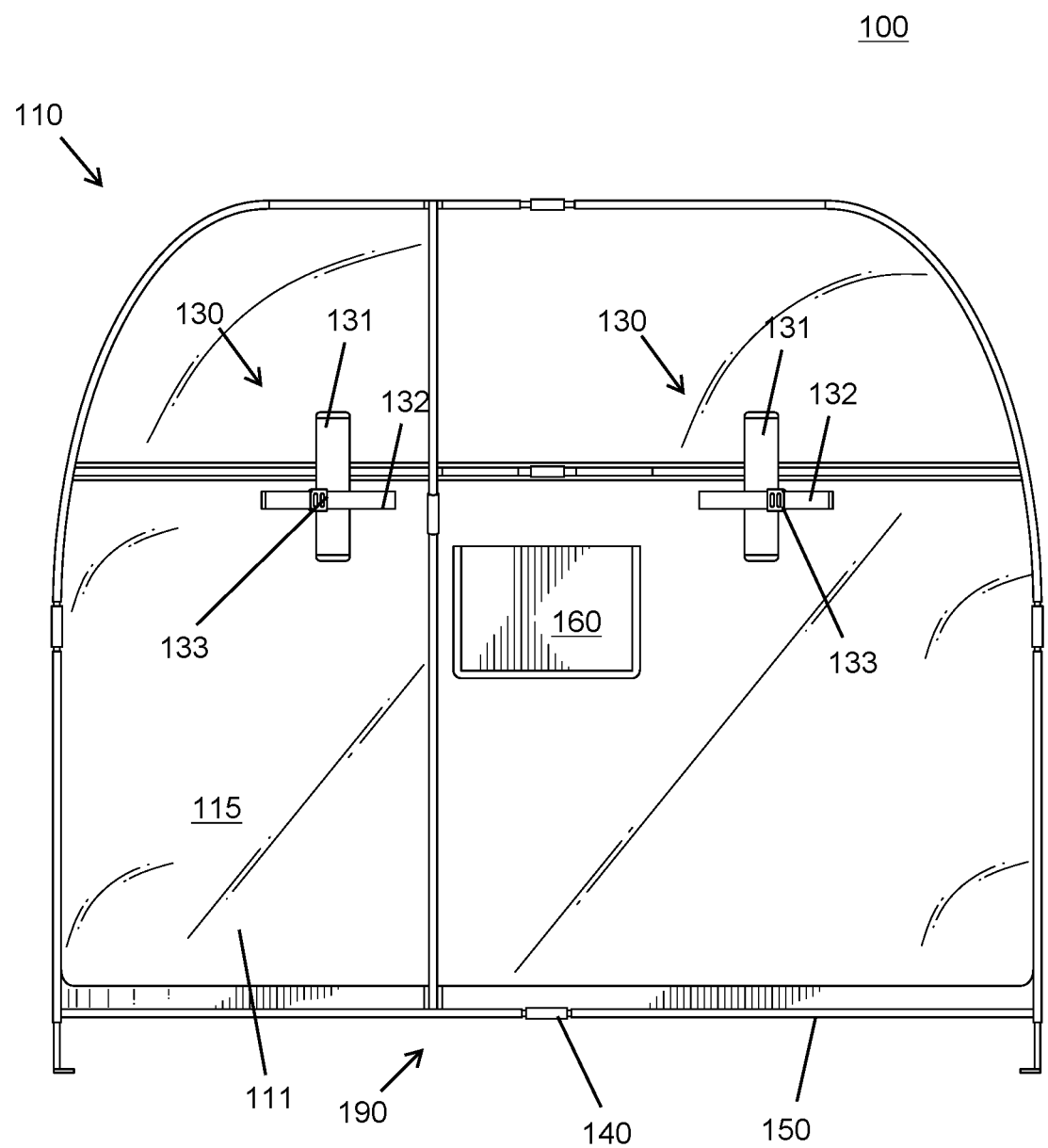
FIG. 3 is a rear view of the vehicle partition in accordance with certain embodiments.
Figure 4:
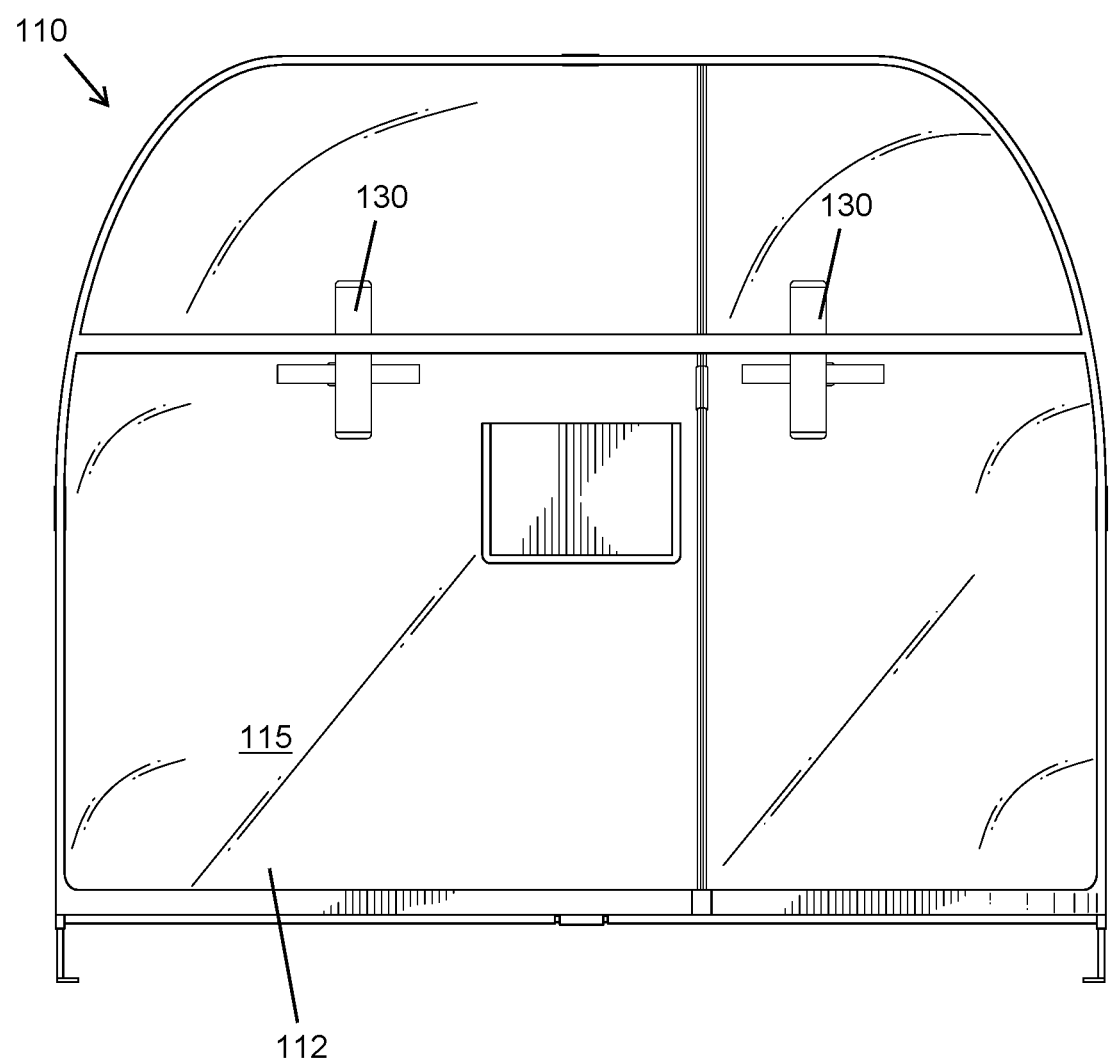
FIG. 4 is a front view of the vehicle partition in accordance with certain embodiments.
Figure 5:
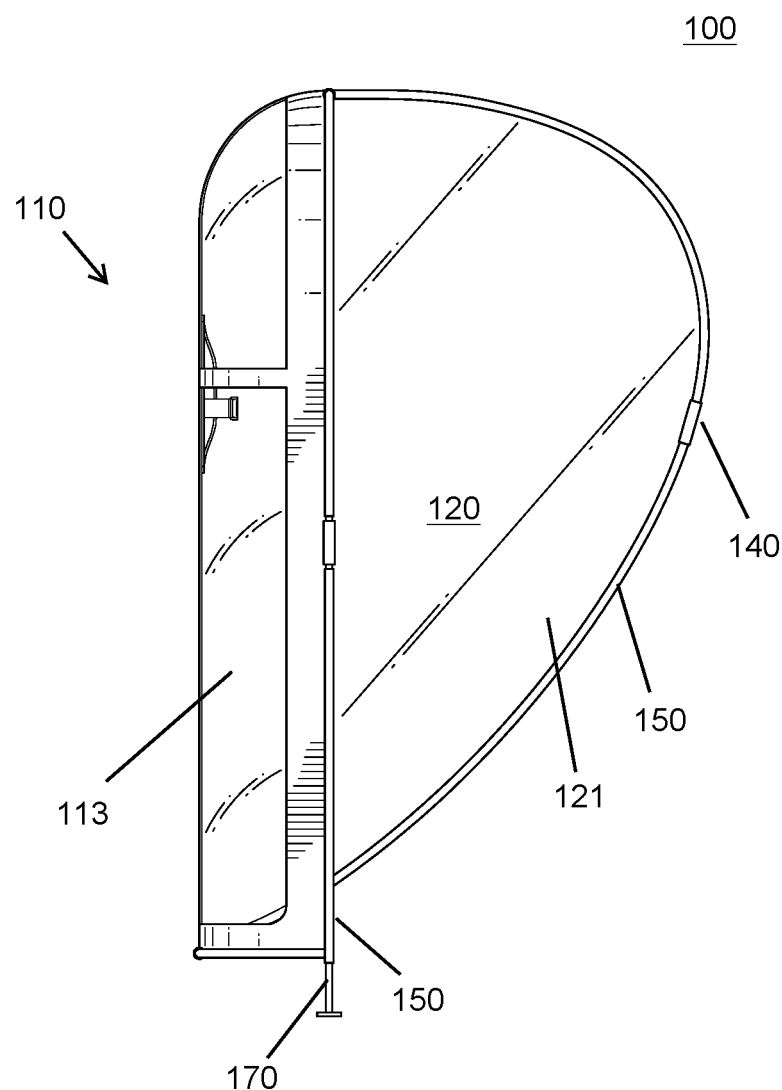
FIG. 5 is a side view of the vehicle partition in accordance with certain embodiments.
Figure 6:
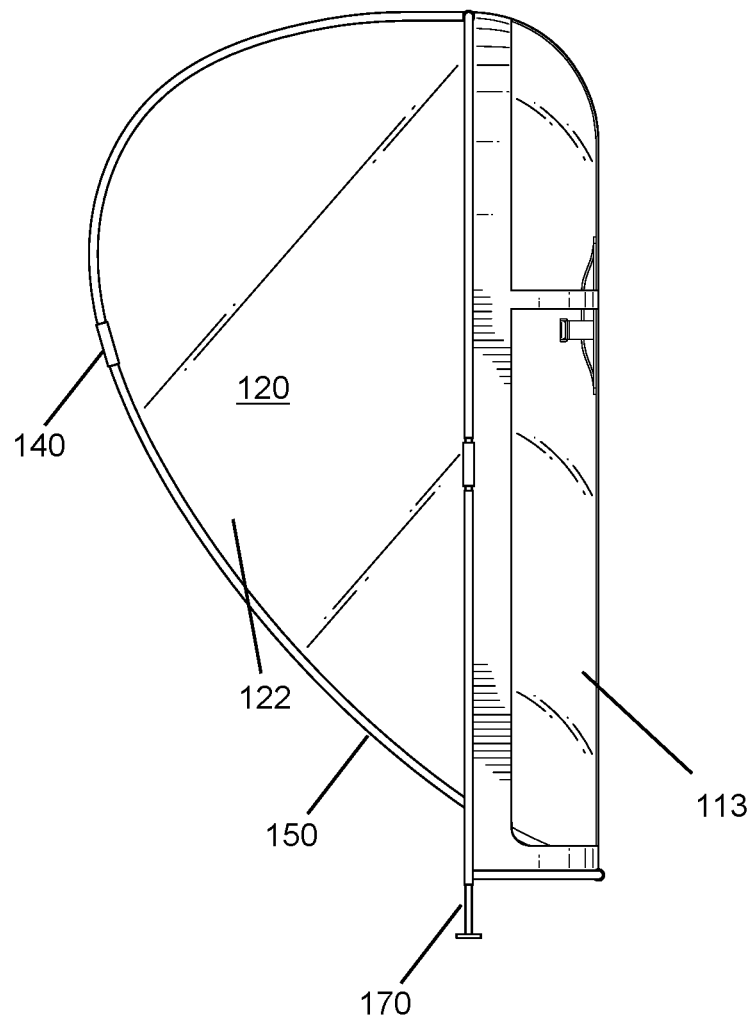
FIG. 6 is an opposite side view of the vehicle partition in accordance with certain embodiments.
Figure 7:
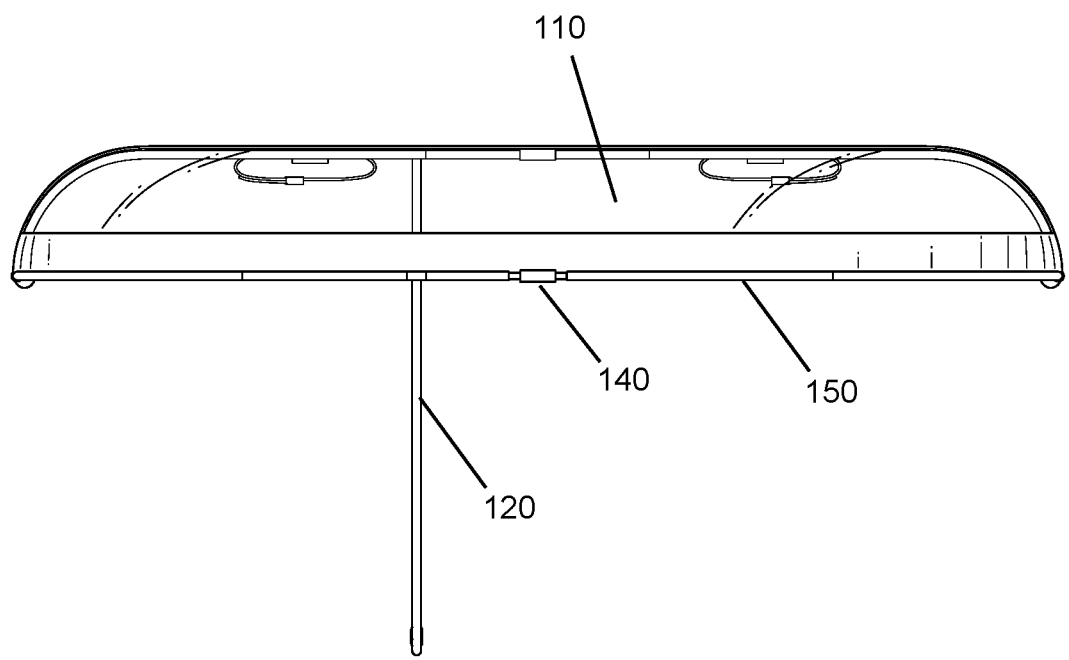
FIG. 7 is a top plan view of the vehicle partition in accordance with certain embodiments.
Figure 8:
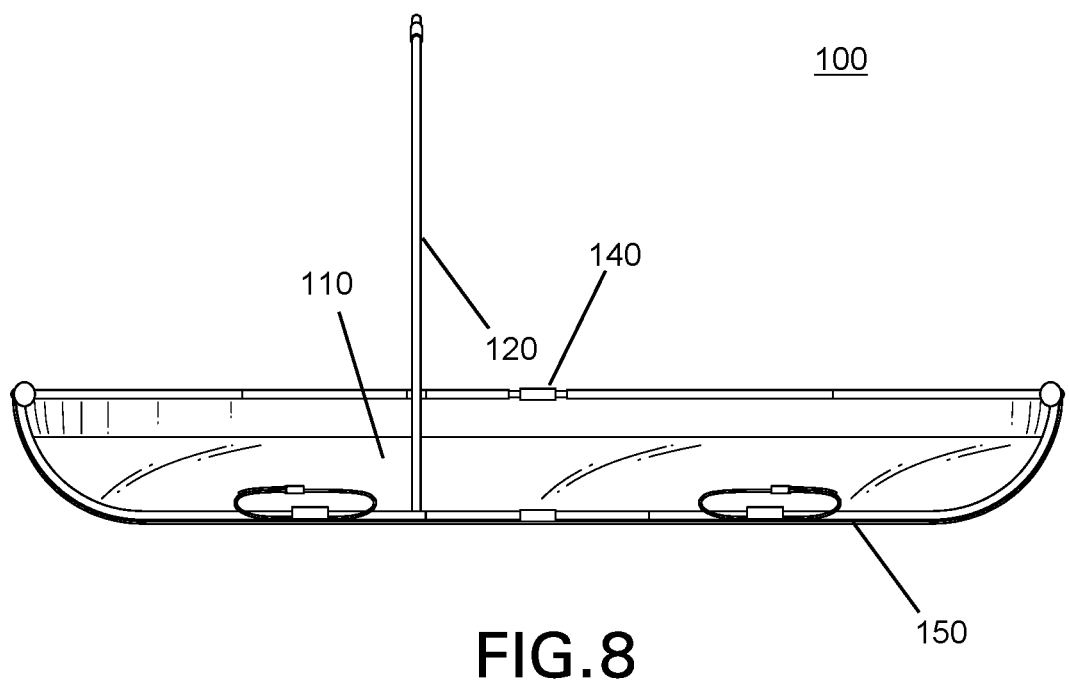
FIG. 8 is a bottom view of the vehicle partition in accordance with certain embodiments.

In certain embodiments, as shown in FIG. 3, the first partition portion 110 may include a pair of attachment members 130, each of which comprises a vertical strap member 131 and a horizontal strap member 132. The attachment members 130 are included on the first surface 111 of the body portion 115 in locations that are proximate to headrests for the driver and passenger seats (see FIG. 10). The vertical strap members 131 and horizontal strap members 132 can be fabricated of nylon, cloth/fabric, polymers, and/or any other materials. The vertical strap members 131 can be connected directly to the first surface 111 of the body portion 115 in the shape of loop. The horizontal strap members 132 are also configured in a loop that is interconnected with the loop formed by the vertical strap members 131. The vertical strap members 131 prevent the horizontal strap members 132 from becoming disconnected, and allow the horizontal strap members 132 to move freely in a range of motion permitted by the loop formed by the vertical strap members 131. The horizontal strap members 132 can be placed around headrests to the secure the first partition portion 110 in place during usage.

FIGS. 11-18 illustrate another configuration of the attachment members 130. In this configuration, the attachment members 130 are connected to the first partition portion 110 near the upper portions of the top and size periphery members 150. Four attachment tabs 154 are attached to the sleeves of the side and top periphery members 150. Each attachment tab 154 comprises a plurality of openings for receiving the vertical strap members 131 and horizontal strap members 132. An individual installing the vehicle partition 100 can customize the location of the vertical strap members 131 and horizontal strap members 132 by inserting the straps in the desired opening.

The horizontal strap members 132 also can include adjustment mechanisms 133. The adjustment mechanisms 133 permit the size of their loops form by the horizontal strap members 132 to be adjusted. For example, the adjustment mechanisms 133 may permit the horizontal strap members 132 to be widened for placement around the headrests, and to be tightened after they are in place around the headrests.

Figure 10:
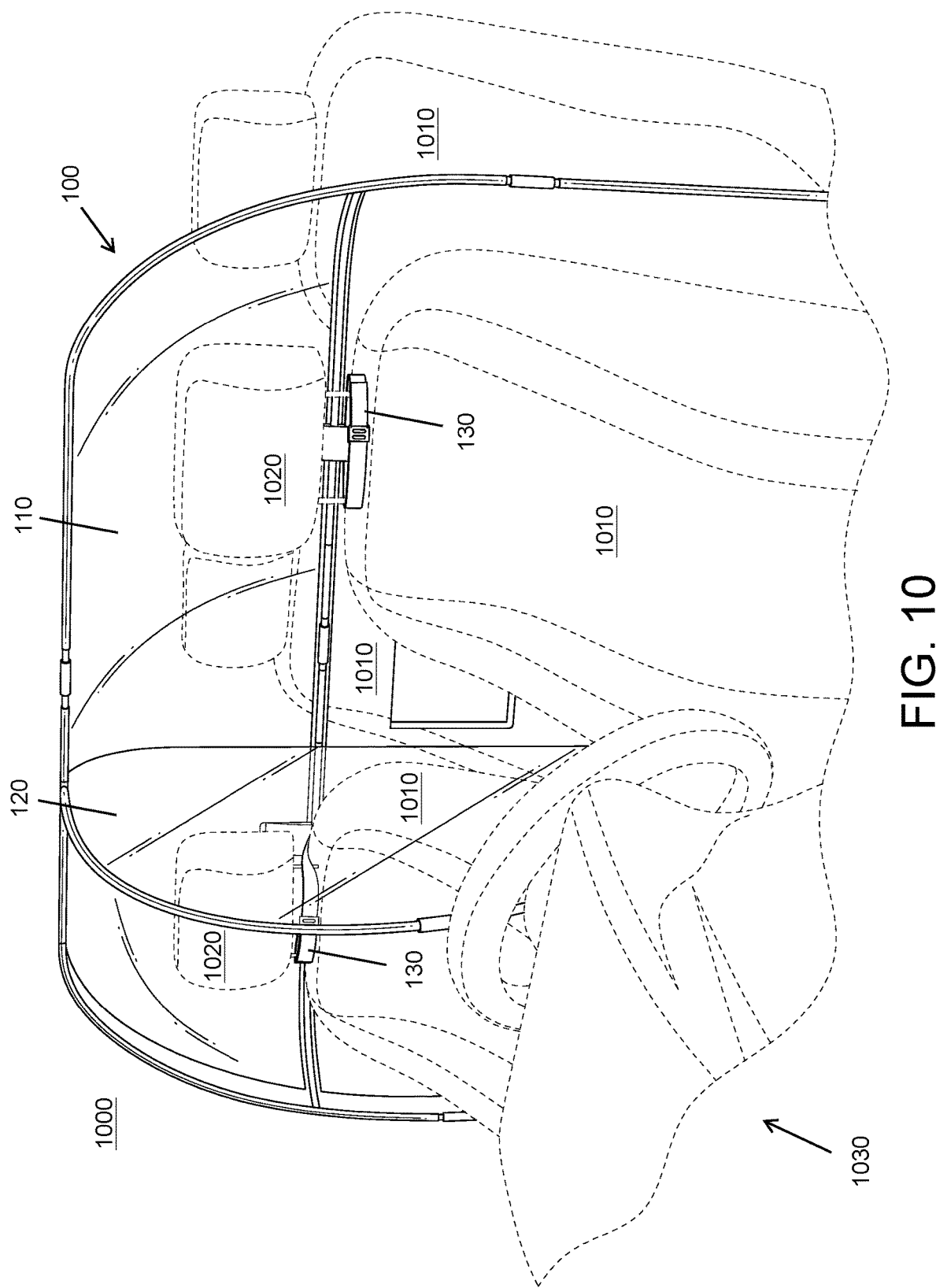
FIG. 10 is an illustration of an exemplary vehicle partition installed in a vehicle cabin in accordance with certain embodiments.
Figure 11:
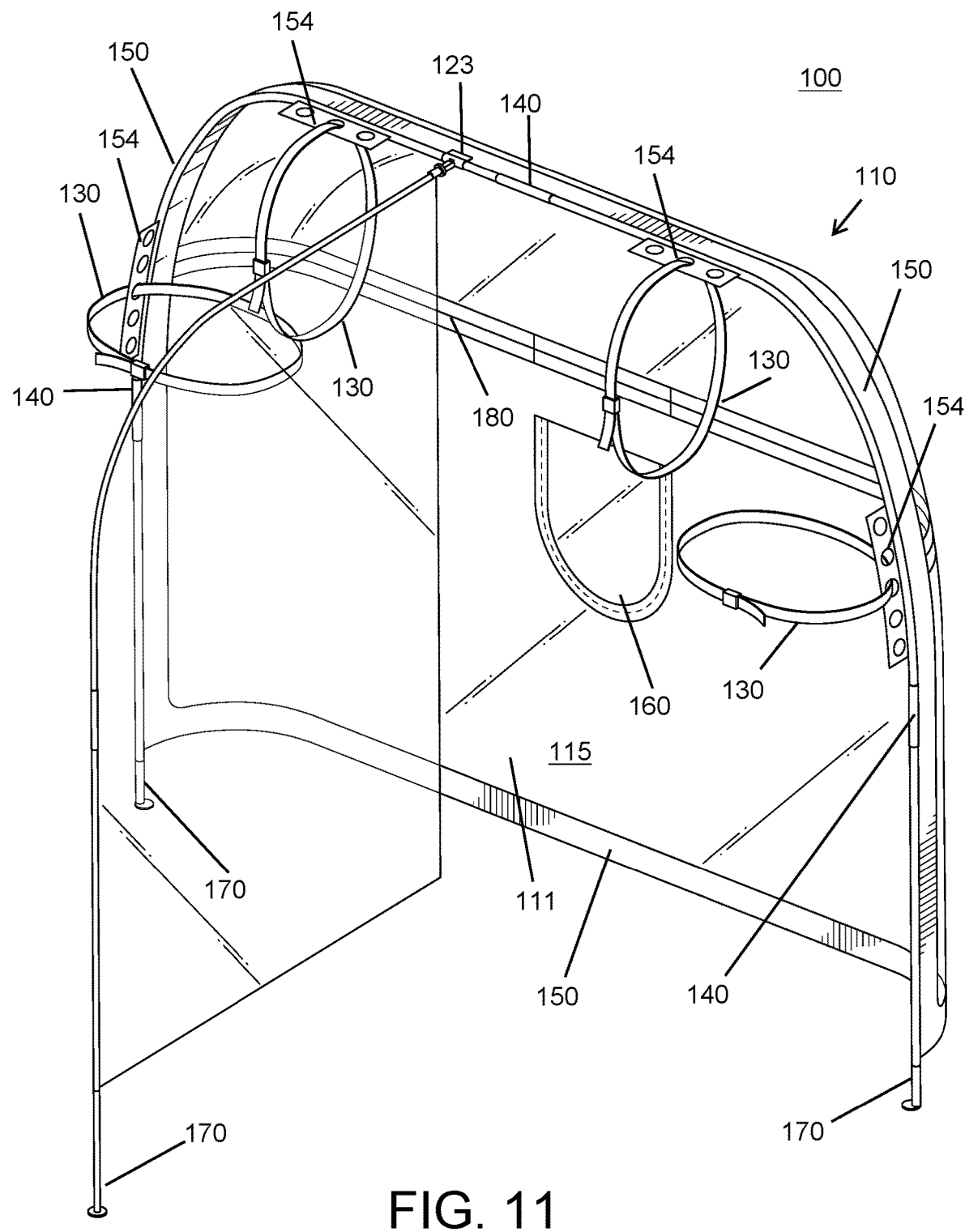
FIG. 11 is a rear perspective view of a second vehicle partition in accordance with certain embodiments.
Figure 12:
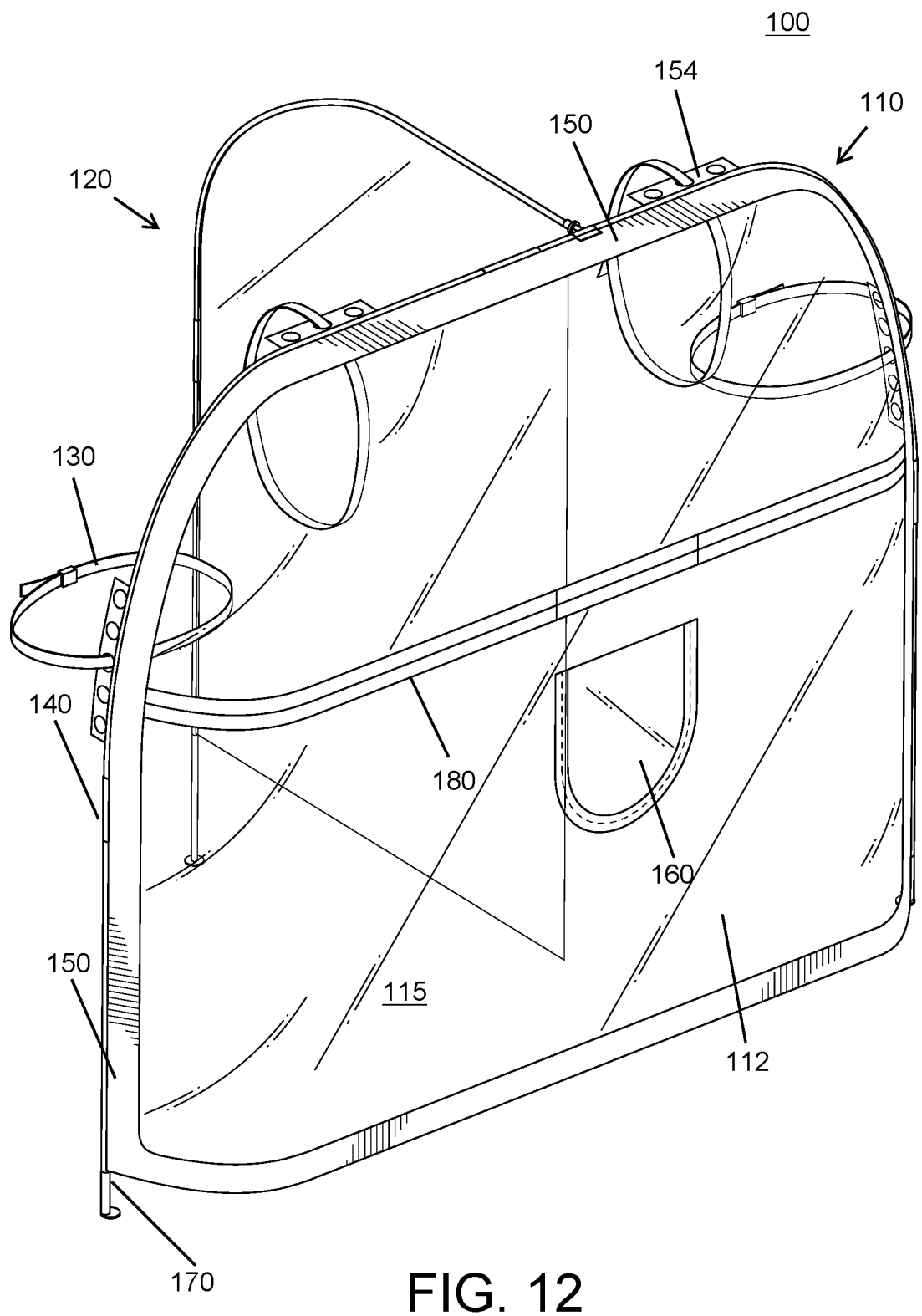
FIG. 12 is a front perspective view of the second vehicle partition in accordance with certain embodiments.
Figure 13:
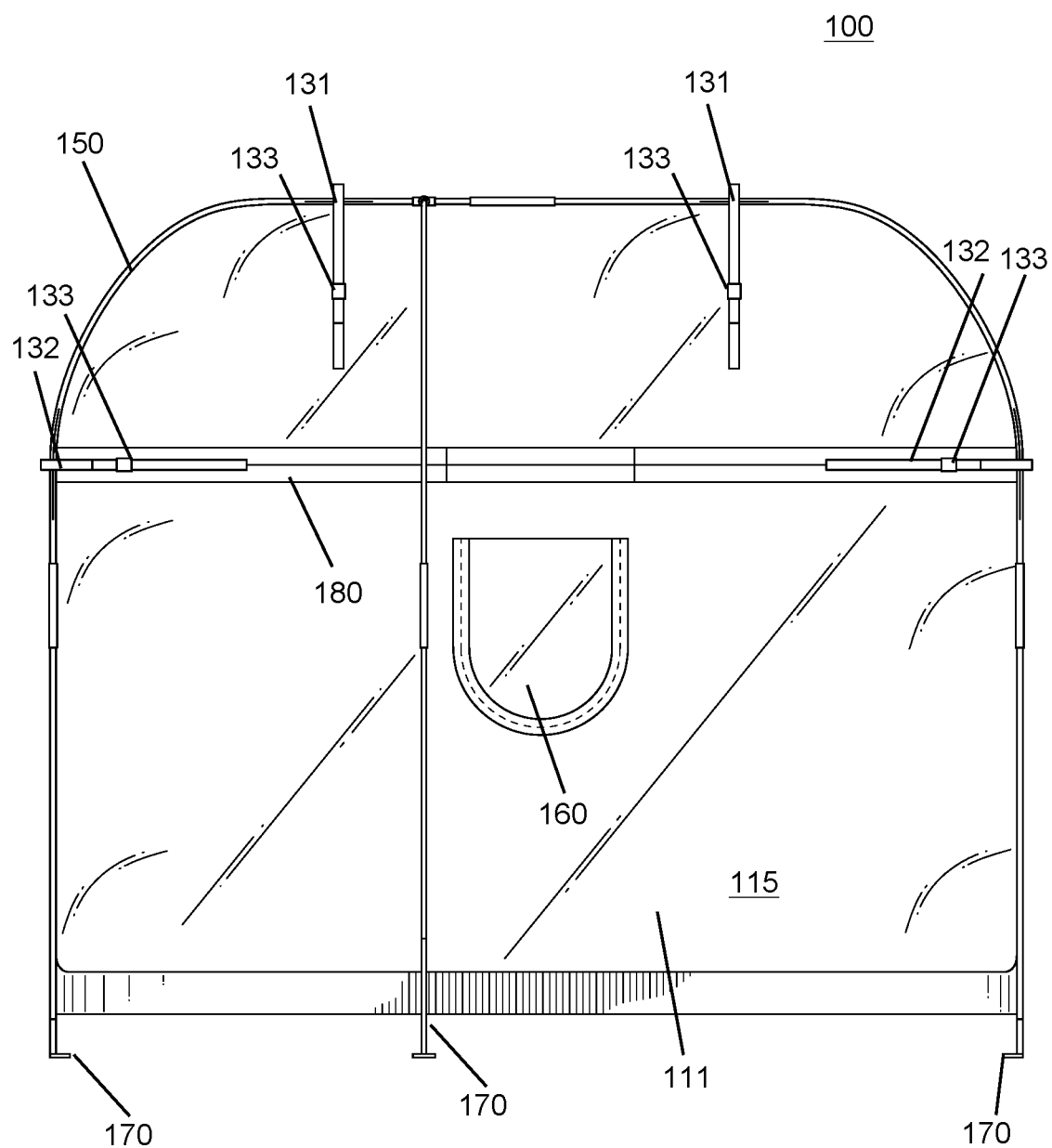
FIG. 13 is a rear view of the second vehicle partition in accordance with certain embodiments.
Figure 14:
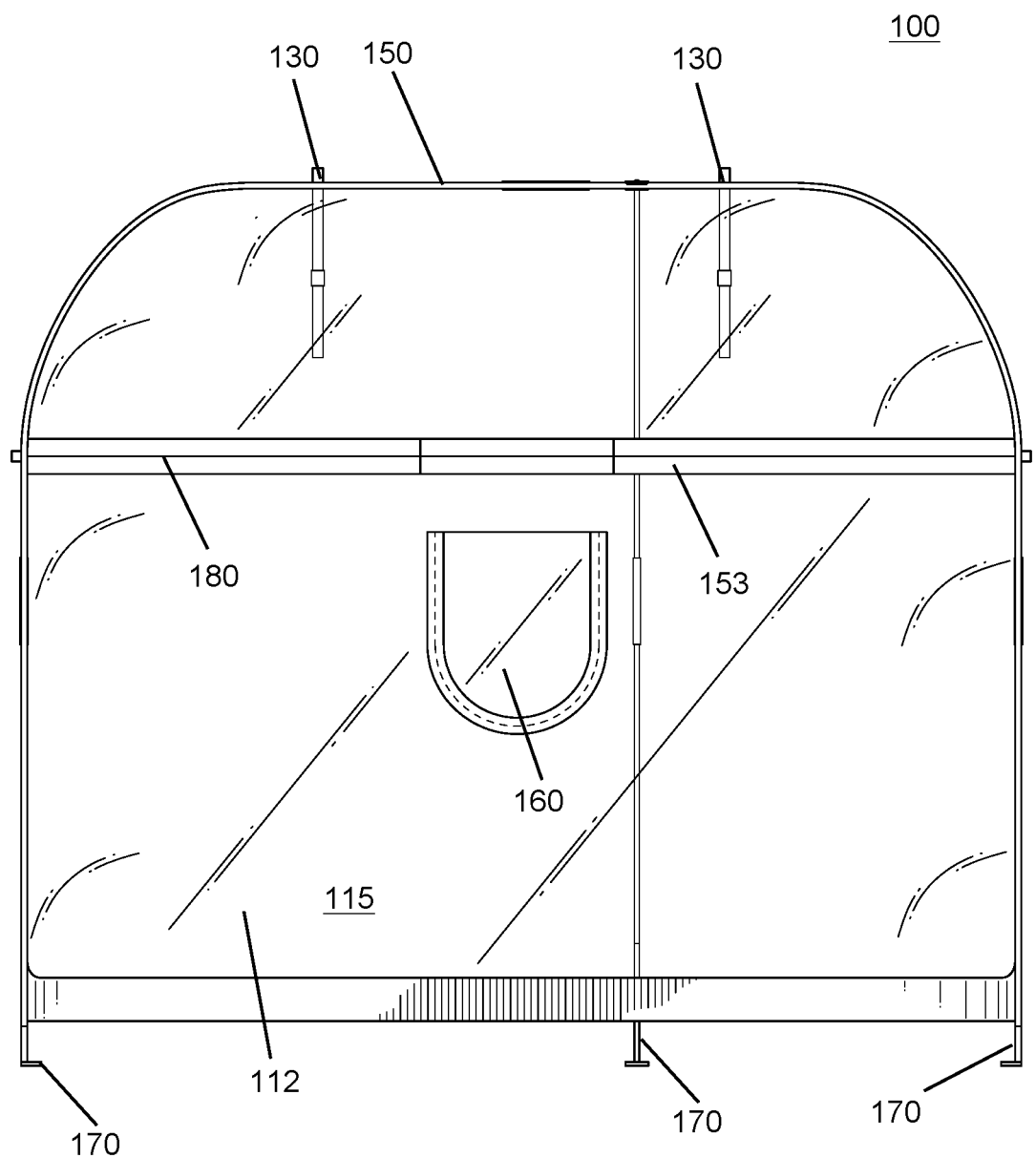
FIG. 14 is a front view of the second vehicle partition in accordance with certain embodiments.
Figure 15:
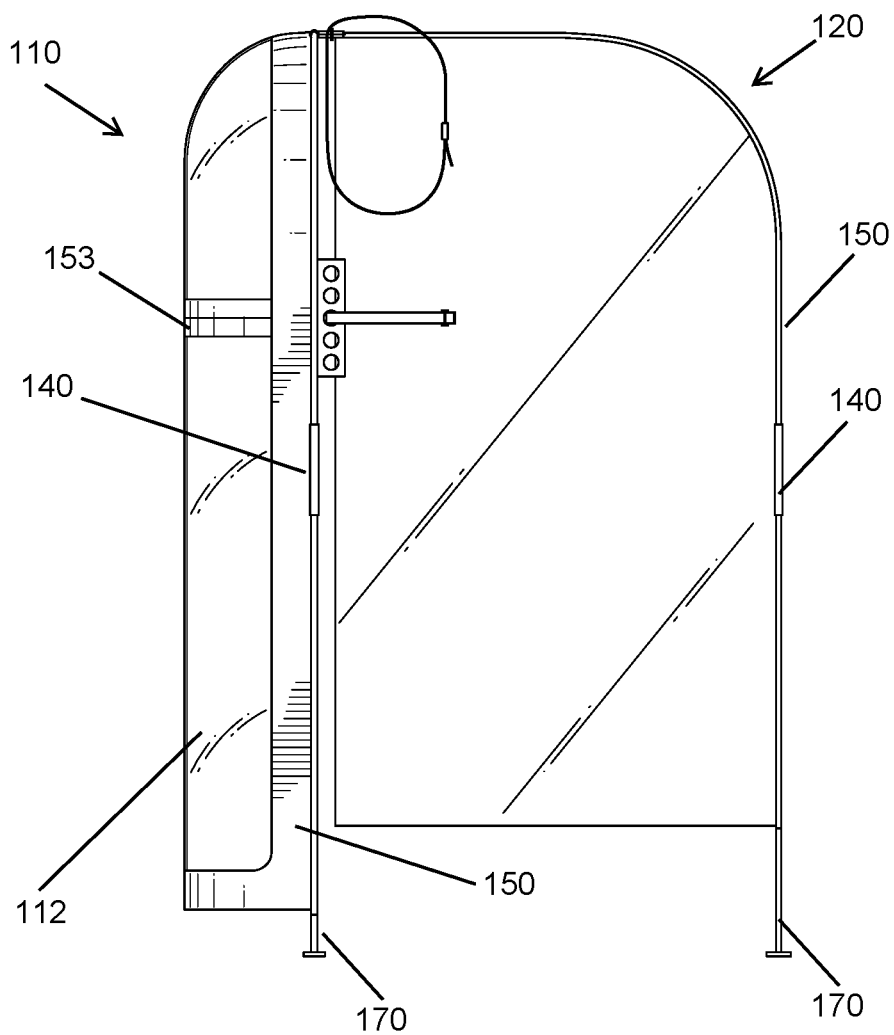
FIG. 15 is a side view of the second vehicle partition in accordance with certain embodiments.
Figure 16:
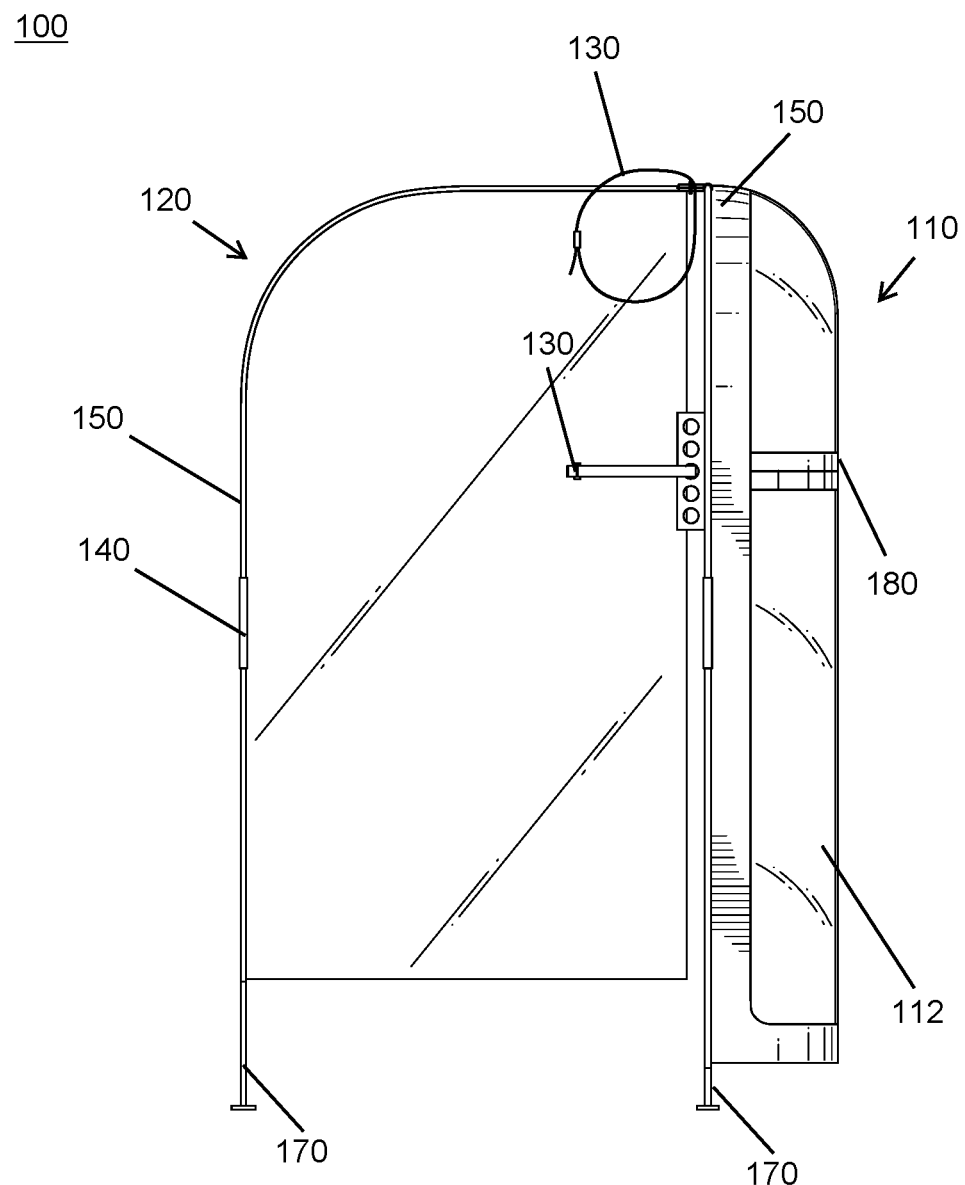
FIG. 16 is an opposite side view of the second vehicle partition in accordance with certain embodiments.
Figure 17:
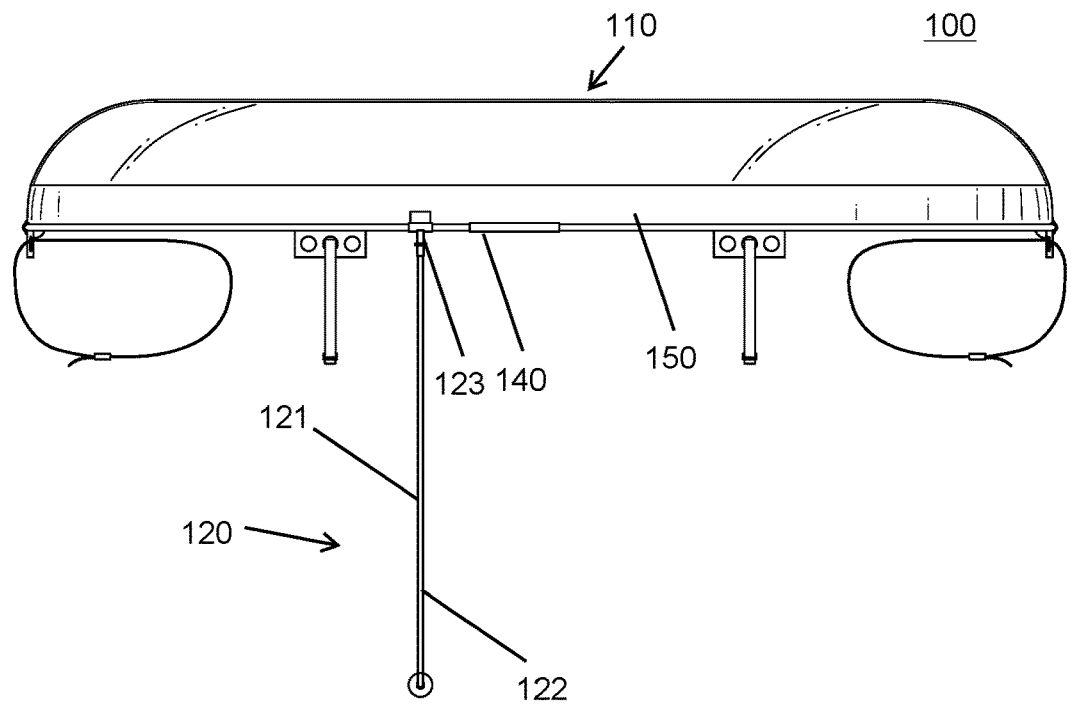
FIG. 17 is a top plan view of the second vehicle partition in accordance with certain embodiments.
Figure 18:
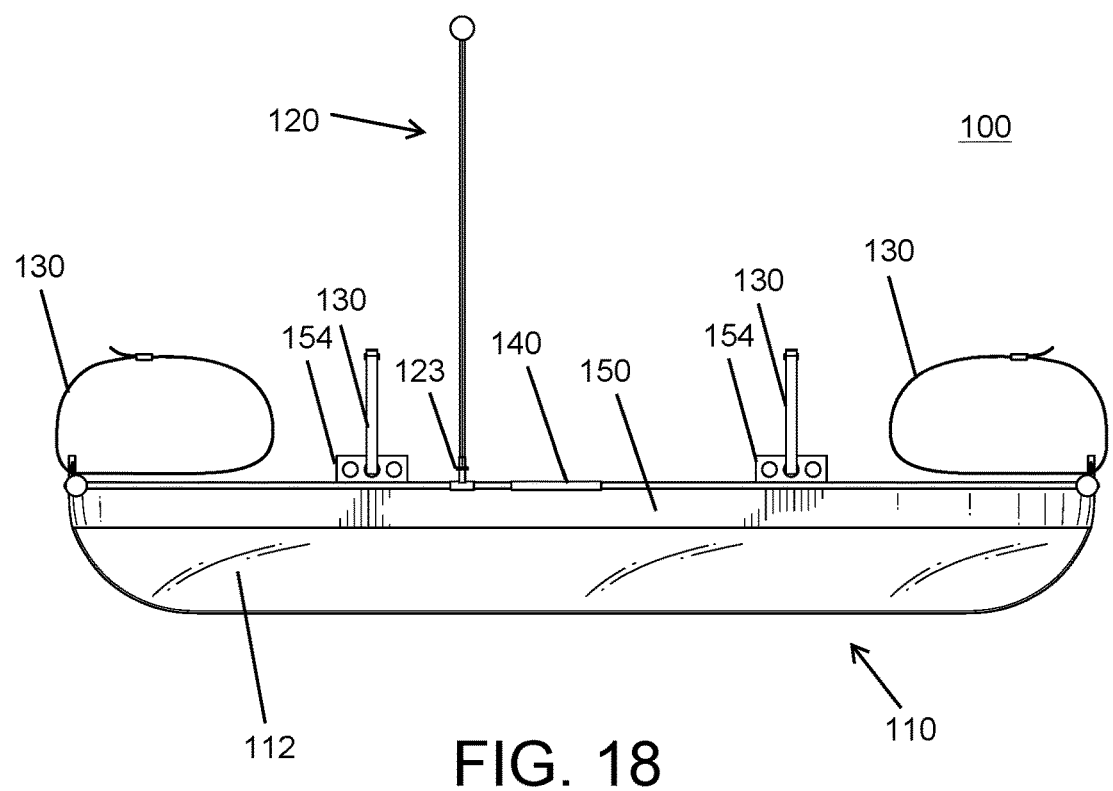
FIG. 18 is a bottom view of the second vehicle partition in accordance with certain embodiments.

FIG. 10 illustrates an exemplary vehicle divider 100 installed in a vehicle 1030 cabin 1000. The vehicle cabin 1000 comprises a plurality of seats 1010, each of which includes a headrest 1020. The vehicle divider 100, which comprises a first partition portion 110 and a second partition portion 120, is installed directly behind the front passenger seat and driver seat in the vehicle cabin 1000. Attachment members 130 are used to secure the vehicle divider 100 to the headrests 1020 of the driver seat and front passenger seat. The first partition portion 110 separates the front passenger seat and driver seat from the rear portion of the vehicle. The second partition portion 120 separates the driver seat from the passenger seat.

Returning to FIGS. 1-8 and 11-18, the first partition portion 110 further includes a window 160. The window 160 can be opened and closed as desired (e.g., to permit passengers to submit payment to the driver and/or for other reasons). Generally speaking, the window 160 can include any mechanism or structural feature that provides a resealable opening in the body portion 115 of the first partition portion 110. The configuration of the window 160 can vary. In certain embodiments, the window 160 may be constructed of vinyl, cloth, fabric, plastics, and/or other materials. In certain embodiments, the window 160 may include a patch of vinyl or fabric that is attachable to, and detachable from, the first surface 111 and/or second surface 112 of the first partition portion 110 using one or more hook and loop fasteners (e.g., VELCRO® fasteners) and/or other types of fasteners. In certain embodiments, the window 160 may include a zipper that permits the window to be sealed and unsealed as desired. The window 160 can alternatively, or additionally, be configured using other structural components and in other ways (e.g., such as a sliding window included on a track, a patch of plastic or fabric that is attached using snap button connectors, etc.). The exemplary window 160 shown in FIGS. 1-8 is constructed in a rectangular shape. The exemplary window 160 shown in FIGS. 11-18 is constructed in a U-shape.

As mentioned above, the second partition portion 120 of the vehicle partition 100 can serve to divide the front portion of a vehicle cabin 1000 (e.g., to separate the driver seat from the front passenger seat). The second partition portion 120 may be situated substantially perpendicular with respect to the first partition portion 110, and may extend outwardly from the first surface 111 of the first partition portion 110. The second partition portion 120 may include a first surface 121 that faces the front passenger seat, and a second surface 122 that faces the driver seat.

The configuration of the second partition portion 120 can vary. The size and/or dimensions of the second partition portion 120 can be any appropriate size that is capable of segmenting a front portion of a vehicle cabin. In certain embodiments (e.g., as shown in FIGS. 1-8), the width of the second partition portion 120 is approximately 10-25 inches (and, is some cases, approximately 20 inches), the height is approximately 42-52 inches (and, is some cases, approximately 47 inches), and the depth is approximately 0.001-0.04 inches (and, is some cases, approximately 0.01 inches).

In certain embodiments (e.g., as shown in FIGS. 11-18), the width of the second partition portion 120 is approximately 20-30 inches (and, is some cases, approximately 25 inches), the height is approximately 30-40 inches (and, is some cases, approximately 35 inches), and the depth is approximately 0.01-0.05 inches (and, is some cases, approximately 0.02 inches).

In some embodiments, the second partition portion 120 can be constructed of the same or similar materials utilized for the first partition portion 110. For example, a body portion of the second partition portion 120, which comprises the first surface 121 and second surface 122, may be constructed of translucent materials to permit two-visibility between the front left and front right portions in the vehicle cabin. Like the first partition portion 110, the body portion of the second partition portion 120 may be constructed of vinyl, MYLAR® (e.g., biaxially-oriented polyethylene terephthalate), polymers, plastics, and/or other materials. In some cases, the second partition portion 120 may be constructed of a shape-memory polymer (e.g., one that includes vinyl or MYLAR®) and/or other shape-memory material, that permits the body portion of the second partition portion 120 to temporarily deform and to return to its original shape. In certain embodiments, the second partition portion 120 may include one or more support structures 170 that enable the second partition portion 120 to rest on an underlying surface. In some cases, the first partition portion 110 and/or the second partition portion 120 can be constructed of antimicrobial materials (e.g., antimicrobial vinyl and/or other materials).

The second partition portion 120 also includes periphery members 150 surrounding the body portion of the second partition portion 120. The periphery members 150 of the second partition portion 120 can be constructed and configured in the same manner as described above with respect to the first partition portion 110. For example, in certain embodiments, the periphery members 150 may include sleeves 151 that house and/or receive rod members 152, as well as joint members 140 that permit the second partition portion 120 to transition to a space-saving configuration.

In certain embodiments, the second partition portion 120 is configured to be detachable and/or removable from the first partition portion 110. For example, in scenarios where there is no passenger seated in the front passenger seat, a vehicle operator may remove or detach the second partition portion 120.

The second partition portion 120 may include one or more connectors 123 that facilitate quick and easy attachment to, and detachment from, the first partition portion 110. For example, a first connector 123 may be located on a top portion of the second partition portion 120 where the periphery member 150 terminates at one end, and a second connector 123 may be located on a bottom portion of the second partition portion 120 where the periphery member 150 terminates at an opposite end. The second partition portion 120 can have an appropriate depth and shape that permits it to fit between the gap located between a center console and the driver seat of a vehicle and/or a gap located between a center console and the front passenger seat of the vehicle. The connectors 123 enable the second partition portion 120 to be connected to the first partition 110 in either gap, or in other desired locations.

The manner in which the second partition portion 120 is connected to the first partition portion 110 can vary. In certain embodiments, the connectors 123 included on the second partition portion 120 may be configured to attach to the periphery members 150 and/or rod members 152 included around the perimeter of the first partition portion 110. For example, as shown in FIGS. 1-8, the connectors 123 may include a circular or semi-circular female connector this can receive and latch onto the circular rod members 152 included on the first partition portion 110. In this embodiment, the connectors 123 can simply be pressed onto the rod member 152 to facilitate the connection of the second partition portion 120. In other embodiments (such as in in FIGS. 11-18), the connectors 123 can include a female connector clip that is configured to latch onto the circular rod members 152 included on the first partition portion 110. The connector clip may be attached to T-connector that can serve to facilitate attachment of the second partition portion 120, and to support the structural integrity of the second partition portion 120 (e.g., by firmly securing a flexible rod member 152 that is received in an opening of the T-connector). Other types of connection mechanism can also be utilized to connect the second partition portion 120 to the first partition portion 110.

The vehicle partitions 100 can be outfitted with various features that assist with minimizing the sizes and/or dimensions of the vehicle partitions 100 for storage when the vehicle partitions 100 are not being used. One particularly useful spacing-saving feature relates to the joint members 140 that are integrated into the first partition portion 110 and second partition portion 120. These joints 140 permit the first partition portion 110 and second partition portion 120 to be folded into compacted configurations having reduced sizes and dimensions.

In the exemplary embodiment illustrated in FIGS. 1-8, the first partition portion 110 comprises eight rod members 152 that are interconnected by five joint members 140, each of which comprises a hinge 142. In particular, the periphery members 150 surrounding the perimeter of the first partition portion 110 comprise six rod members 152 (included in six sleeves 151) interconnected by four joint members 140, and the lateral support member 180 comprises two additional rod members 152 with corresponding sleeves 151, as well as a single joint member 140. The exemplary embodiment of the second partition portion 120 illustrated in FIGS. 1-8 comprises two rod members 152 (included in a pair of sleeves 151) and a single joint member 140 (which comprises a hinge 142), all of which are located around the outer perimeter of the second partition portion 120. It should be recognized that the number of periphery members 150, sleeves 151, rod members 152, and/or joint members 140 can be varied, as well as their locations on the first and second partition portions.

In the exemplary embodiment illustrated in FIGS. 11-18, the first partition portion 110 comprises four flexible rod members 152 (included in four sleeves 151), which are not directly connected to each other and which can be secured together using only a lock member 141 (discussed in further detail below). Unlike the embodiment in FIGS. 1-8, flexible rod members 152 are not included on the bottom portion. Moreover, the lateral support member 180 comprises two deformable band members 153 (e.g., aluminum strips or bands of material) which are separated by a gap near the window 160. The configuration of the second partition portion 120 generally includes the same configuration as described above with respect to FIGS. 1-18, but does not include a hinge at the join member. Moreover, it includes a support member 170 that allows the second partition portion to rest on an underlying surface.

When uninstalling the vehicle partitions 100 illustrated in FIGS. 1-8 and 11-18, a second partition portion 120 may initially be detached from the first partition portion 110

(assuming the second partition portion 120 is currently connected to the vehicle partition 100). In certain embodiments, the second partition portion 120 may be detached by disconnecting the connectors 123 from the rod members 152 included on the first partition portion 110. In some cases, this can easily be performed by manually pulling or separating the connectors 123. Once removed, second partition portion 120 can then be folded at the joint member 140 to transition the second partition portion 120 to a space-saving configuration.

Next, the attachment members 130 that secure the first partition portion 110 to the seats 1010, headrests 1020, or other interior portions of the vehicle cabin may be disconnected. Once disconnected, pressure may be applied to the first partition portion 110 in the direction toward the rear of the vehicle (or, in some cases, towards the front of the vehicle depending on the angle in which the first partition is installed) to break the press-fit connection holding it in place within the vehicle cabin.

The first partition portion 110 may then be folded into a space-saving configuration. The joint members 140 included on the first partition portion 110 permit the first partition portion 110 to be folded in both the horizontal and vertical directions to transition the first partition portion 110 to the space-saving configuration. For example, the three joint members 140 located along a central, vertical axis of the first partition portion 110 can facilitate folding of the first partition portion in the horizontal direction. These three joint members 140 are located centrally on the top periphery member, the bottom periphery member, and the lateral support member 180. Likewise, the other two joint members 140 located along a central, horizontal axis of the first partition portion 110 can facilitate folding of the first partition portion in the vertical direction. These two joint members 140 are located centrally on the right and left periphery members 150. By folding the first partition portion 110 in both the horizontal and vertical directions, the size and/or dimensions of the first partition portion 110 can be reduced to approximately one-fourth of those when the first partition portion 110 is deployed in its operational configuration.

FIGS. 9A-9B and 19A-19B illustrate exemplary configurations of joint members 140 that can be utilized by the vehicle partitions 100 according to certain embodiments (e.g., such as those in FIGS. 1-8). The configuration of the joint members 140 may vary. The details of the exemplary joint members 140 illustrated in these figures and described herein are applicable to any of the joint members 140 included on the first partition portion 110 and/or second partition portion 120.

Figure 9B:
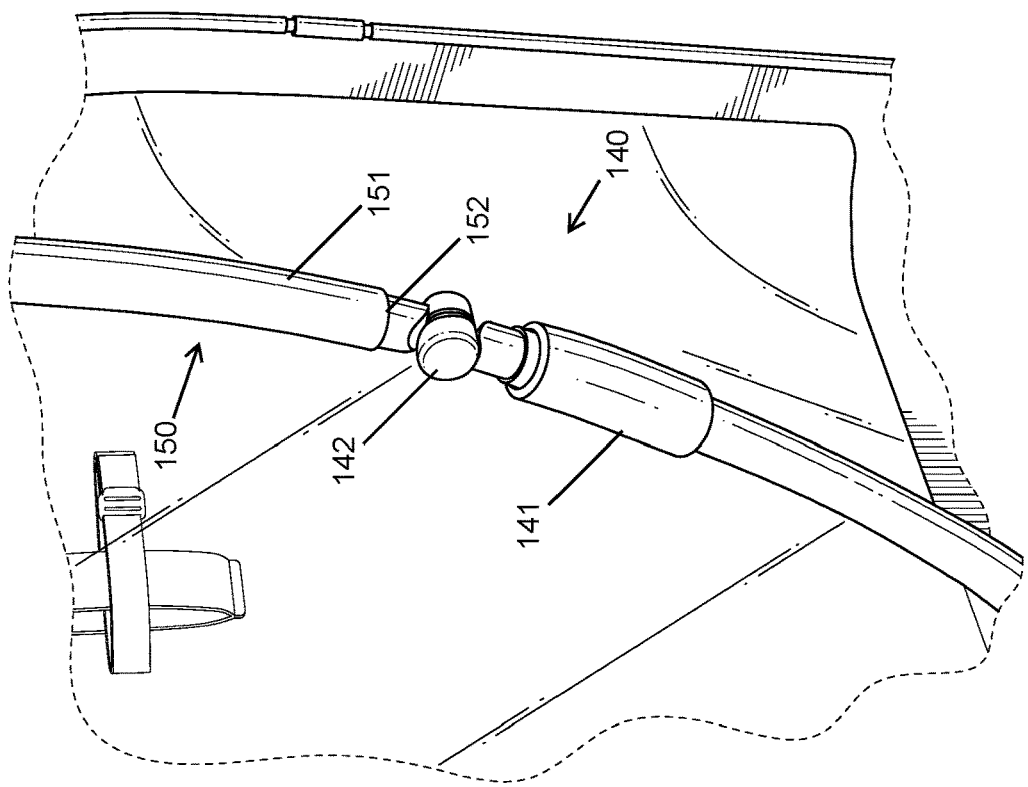
FIG. 9B is an exemplary joint member in a covered position in accordance with certain embodiments.

With reference to FIGS. 9A-9B, each joint member 140 may include a hinge member 142 and a lock member 141. The hinge member 142 and lock member 141 can be constructed of metals (e.g., aluminum, steel, iron, nickel, etc.), plastics, and/or other materials. The hinge member 142 is configured to be moveable or rotatable to permit folding of the first partition portion 110 and/or second partition portion 120 that includes the hinge member 142. The lock member 141 can include a rigid tube (e.g., which may be constructed of steel or plastic in some cases) that is able to slide along a rod member 152 (or corresponding sleeve 151). The lock member 141 can be moved between a first position that covers the hinge member 142 (see FIG. 9B) and a second position which exposes the hinge member 142 (see FIG. 9A). When the lock member 141 is situated in the first position covering the hinge member 142, the lock member 141 can prevent the hinge member 142 from folding, rotating, and/or moving. When the lock member 141 is situated in the second position exposing the hinge member 142, the joint member 142 is free to fold, rotate, and/or otherwise move.

Figure 19B:
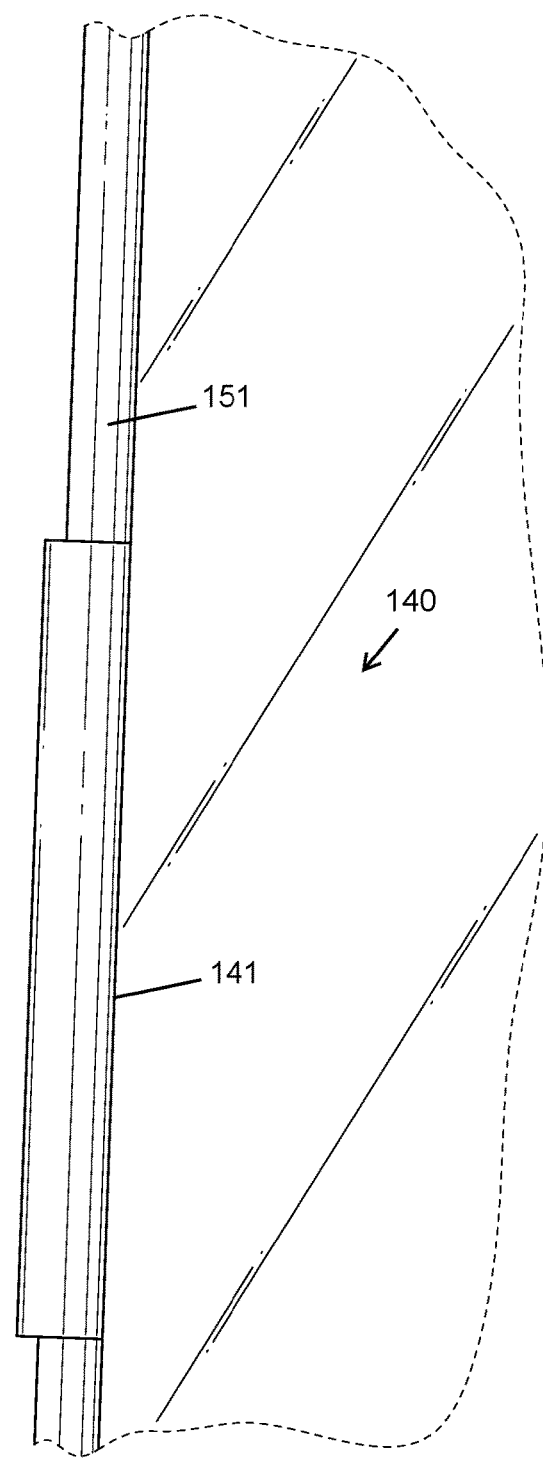
FIG. 19B is an exemplary joint member in a covered position in accordance with certain embodiments.

With reference to FIGS. 19A-19B, the configuration of the joint members 140 is largely the same except that they do not include hinge members 142. Rather, gaps 143 or openings located between adjacent rod members 152 permit folding of the partition portions. For example, as shown as FIG. 19A, two adjacent rod members 152 are included in a sleeve 151, and a gap 143 or spacing between the adjacent rod members 152 may be covered by the sleeve 151. In some embodiments, the gaps 143 or openings between adjacent rod members 152 may be approximately 0.0625-0.25 inches (and, in some cases, approximately 0.125 inches). The lock members 141 secure the adjacent rod members 152 together when situated in the first position (covering the gaps 143 or openings between adjacent rod members 152). When the lock members 141 are arranged in the second position (which expose the gaps 143 or openings between adjacent rod members 152), the partition portions can be folded both horizontally and vertically as described above.

When the vehicle partition 100 in FIG. 1-8 or 11-18 is being used, the lock members 141 can be configured in the first position to secure the structural integrity of the first partition portion 110 and/or second partition portion 120. When the vehicle partition 100 is being uninstalled or transitioned to a space-saving configuration, the lock members 142 can be configured in the second position to enable folding of the first partition portion 110 and/or second partition portion 120. In addition to permitting the vehicle partitions 100 to transition to space-saving configurations, another benefit of the joint members 140 is that they can be manipulated to permit reclining of the driver seat and front passenger seats when the vehicle partition is installed inside a vehicle cabin.

FIG. 9A illustrates an exemplary hinge member 142 that is configured in a knee-joint configuration. However, it should be recognized that other types of hinge members 142 may be incorporated into the vehicle partitions 100 described herein. For example, in some cases, the hinge members 142 and/or joint members 140 may include push-to-connect fasteners or connectors. The push-to-connect fasteners or connectors can permit an individual to easily snap (or otherwise connect) the rod members 152 together when the vehicle partition 100 is being prepared for installation. Similarly, when uninstalling the vehicle partition 100 and/or converting the vehicle partition 100 to a spacing-saving configuration, pressure can be applied to easily disconnect or release the push-to-connect fasteners or connectors. Other types of detachable connection mechanisms may also be used for the hinge members 142 and/or joint members 140.

In certain embodiments, a vehicle partition assembly comprises: (i) a first partition portion, wherein the first partition portion includes: (a) a body portion comprising a first surface and a second surface, wherein: the body portion is constructed of a deformable material, a center portion of the body portion is substantially planar, sides of the body portion include a curvature that forms a pair of side walls, and a top portion of the body portion includes a curvature that forms a top wall; and (b) a plurality of periphery members located around a perimeter of the body portion, wherein the plurality of periphery members include a plurality of flexible rods; wherein the deformable material of the body portion and the flexible rods included in the plurality of periphery members enable the first partition portion to deform under pressure resulting from installation of the first partition portion within a cabin of a vehicle; and (ii) a second partition portion, wherein: the second partition portion is substantially perpendicular to the first partition portion, the second partition portion extends outwardly from the first surface of body portion, and the second partition portion is configured to be detachable from the first partition portion.

In certain embodiments, a vehicle partition comprises: a first partition portion, wherein the first partition portion includes: (a) a body portion comprising a first surface and a second surface, wherein: the body portion is constructed of a deformable material, a center portion of the body portion is substantially planar, sides of the body portion include a curvature that forms a pair of side walls, and a top portion of the body portion includes a curvature that forms a top wall; and (b) a plurality of periphery members located around a perimeter of the body portion, wherein the plurality of periphery members include a plurality of flexible rods; and wherein the deformable material of the body portion and the flexible rods included in the plurality of periphery members enable the first partition portion to deform under pressure resulting from installation of the first partition portion within a cabin of a vehicle.

In certain embodiments, the vehicle partition and/or vehicle partition assembly may be configured such that: (a) the first partition portion is configured to be installed in a portion of the cabin located behind a front row of seating; (b) the first partition portion is sized according to a first set of dimensions that at least define a height and a width of the first partition portion; (c) the cabin of the vehicle is sized according to a second set of dimensions that at least define a height and a width of the cabin; (d) the first set of dimensions associated with the first partition portion are sized such that they are larger than the second set of dimensions defining the cabin; and (e) the deformable material of the body portion and the flexible rods included in the plurality of periphery members enable a shape of the first partition portion to deform and compact to accommodate the second set of dimensions associated with the cabin.

While various novel features of the invention have been shown, described, and pointed out as applied to particular embodiments thereof, it should be understood that various omissions and substitutions and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding therefrom of the teachings of the invention and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention.

What is claimed is:

1. A vehicle partition assembly comprising:
   a first partition portion, wherein the first partition portion includes:
      a body portion comprising a first surface and a second surface, wherein: the body portion is constructed of a deformable material, a center portion of the body portion is substantially planar, sides of the body portion include a curvature that forms a pair of side walls, and a top portion of the body portion includes a curvature that forms a top wall; and
      a plurality of periphery members located around a perimeter of the body portion, wherein the plurality of periphery members include a plurality of flexible rods;
   wherein the deformable material of the body portion and the flexible rods included in the plurality of periphery members enable the first partition portion to deform under pressure resulting from installation of the first partition portion within a cabin of a vehicle; and
   a second partition portion, wherein: the second partition portion is substantially perpendicular to the first partition portion, the second partition portion extends outwardly from the first surface of body portion, and the second partition portion is configured to be detachable from the first partition portion.

2. The vehicle partition assembly of claim 1, wherein the first surface of the body portion comprises a pair of attachment members, the attachment members comprising one or more straps for securing the first partition portion to a headrest or a seat inside of the vehicle.

3. The vehicle partition assembly of claim 1, wherein the first partition portion further comprises one or more support members located near a bottom portion of the first partition portion, and the one or more support members are adjustable to retract or extend a height of the first partition portion.

4. The vehicle partition assembly of claim 1, wherein the first partition portion is configured to be installed in the cabin of the vehicle by forming a press fit connection with interior walls of the cabin and without using hardware to connect the first partition portion to interior portions of the cabin.

5. The vehicle partition assembly of claim 1, wherein the plurality of periphery members further include a plurality of sleeves located around a perimeter of the body portion and the plurality of sleeves house the flexible rods.

6. The vehicle partition assembly of claim 1, wherein the first partition portion further comprises a plurality of joint members that situated between adjacent flexible rods, and the plurality of joint members permit the first partition portion to be transitioned into a space-saving configuration.

7. The vehicle partition assembly of claim 6, wherein the plurality of joint members are configured to allow the first partition portion to be folded in both a vertical direction and a horizontal direction.

8. The vehicle partition assembly of claim 6, wherein:
   each of the plurality of joint members includes a lock member that is configured to transition between a first position and a second position;
   the lock member prevents the joint member from folding or rotating in the first position; and
   the joint member is free to fold or rotate when the lock member is in the second position.

9. The vehicle partition assembly of claim 1, wherein:
   the first partition portion is configured to be installed in a portion of the cabin located behind a front row of seating;

the first partition portion is sized according to a first set of dimensions that at least define a height and a width of the first partition portion;

the cabin of the vehicle is sized according to a second set of dimensions that at least define a height and a width of the cabin;

the first set of dimensions associated with the first partition portion are sized such that they are larger than the second set of dimensions defining the cabin; and the deformable material of the body portion and the flexible rods included in the plurality of periphery members enable a shape of the first partition portion to deform and compact to accommodate the second set of dimensions associated with the cabin.

10. The vehicle partition assembly of claim 1, wherein:

the first partition portion is configured to be installed directly behind a front row of seating in the vehicle, and provides a barrier between the front row of seating and one or more rows of rear seating in the cabin; and the second partition portion is configured to extend between a front driver seat and front passenger seat, and provides a second barrier between the front driver seat and the front passenger seat.

11. A vehicle partition comprising:

a first partition portion, wherein the first partition portion includes:

a body portion comprising a first surface and a second surface, wherein: the body portion is constructed of a deformable material, a center portion of the body portion is substantially planar, sides of the body portion include a curvature that forms a pair of side walls, and a top portion of the body portion includes a curvature that forms a top wall; and a plurality of periphery members located around a perimeter of the body portion, wherein the plurality of periphery members include a plurality of flexible rods; and wherein the deformable material of the body portion and the flexible rods included in the plurality of periphery members enable the first partition portion to deform under pressure resulting from installation of the first partition portion within a cabin of a vehicle.

12. The vehicle partition of claim 11, wherein the vehicle partition further comprises:

a second partition portion, wherein the second partition portion is substantially perpendicular with respect to the first partition portion.

13. The vehicle partition of claim 11, wherein the first surface of the body portion comprises a pair of attachment members, the attachment members comprising one or more straps for securing the first partition portion to a headrest or a seat inside of the vehicle.

14. The vehicle partition of claim 11, wherein the first partition portion further comprises one or more support members located near a bottom portion of the first partition portion, and the one or more support members are adjustable to retract or extend a height of the first partition portion.

15. The vehicle partition of claim 11, wherein the first partition portion is configured to be installed in the cabin of the vehicle by forming a press fit connection with interior walls of the cabin and without using hardware to connect the first partition portion to interior portions of the cabin.

16. The vehicle partition of claim 11, wherein the plurality of periphery members further include a plurality of sleeves located around a perimeter of the body portion and the plurality of sleeves house the flexible rods.

17. The vehicle partition of claim 11, wherein the first partition portion further comprises a plurality of joint members that situated between adjacent flexible rods, and the plurality of joint members permit the first partition portion to be transitioned into a space-saving configuration.

18. The vehicle partition of claim 17, wherein:

the plurality of joint members are configured to allow the first partition portion to be folded in both a vertical direction and a horizontal direction;

each of the plurality of joint members includes a lock member that is configured to transition between a first position and a second position;

the lock member prevents the joint member from folding or rotating in the first position; and the joint member is free to fold or rotate when the lock member is in the second position.

19. The vehicle partition of claim 11, wherein:

the first partition portion is configured to be installed in a portion of the cabin located behind a front row of seating;

the first partition portion is sized according to a first set of dimensions that at least define a height and a width of the first partition portion;

the cabin of the vehicle is sized according to a second set of dimensions that at least define a height and a width of the cabin;

the first set of dimensions defining the first partition portion are sized such that they are larger than the second set of dimensions defining the cabin; and the deformable material of the body portion and the flexible rods included in the plurality of periphery members enable a shape of the first partition portion to deform and compact to accommodate the second set of dimensions associated with the cabin.

20. The vehicle partition of claim 11, wherein:

the first partition portion is configured to be installed directly behind a front row of seating in the vehicle, and provides a barrier between the front row of seating and one or more rows of rear seating in the cabin; and a second partition portion is configured to extend between a front driver seat and front passenger seat, and provides a second barrier between the front driver seat and the front passenger seat.

\* \* \* \* \*